(12) United States Patent
Brown et al.

(10) Patent No.: US 12,259,095 B2
(45) Date of Patent: Mar. 25, 2025

(54) PREDICTIVE AND PREVENTATIVE MAINTENANCE SYSTEMS FOR CONNECTED WATER DEVICES

(71) Applicant: PENTAIR PLC, London (GB)

(72) Inventors: Edward Brown, Thousand Oaks, CA (US); Roger Turley, Wales, UT (US); Christopher Chomeau, Milwaukee, WI (US); Brian Boothe, Raleigh, NC (US); David MacCallum, Camarillo, CA (US); Marc Brentjens, Roermond (NL); Brian Broga, Elkhorn, WI (US); Justin Kutney, Pewaukee, WI (US)

(73) Assignee: PENTAIR PLC, London (GB)

( * ) Notice: Subject to any disclaimer, the term of this patent is extended or adjusted under 35 U.S.C. 154(b) by 651 days.

(21) Appl. No.: 17/347,269

(22) Filed: Jun. 14, 2021

(65) Prior Publication Data
US 2021/0301985 A1 Sep. 30, 2021

Related U.S. Application Data

(63) Continuation of application No. PCT/GB2019/053527, filed on Dec. 12, 2019.
(Continued)

(51) Int. Cl.
*F17D 5/06* (2006.01)
*G05B 23/02* (2006.01)
(Continued)

(52) U.S. Cl.
CPC ........... *F17D 5/06* (2013.01); *G05B 23/0221* (2013.01); *G05B 23/027* (2013.01); *G06Q 10/20* (2013.01); *G06Q 30/016* (2013.01); *G06Q 50/06* (2013.01)

(58) Field of Classification Search
CPC .. G05B 23/0221; G05B 23/027; G06Q 10/20; G06Q 30/016; G06Q 50/06
See application file for complete search history.

(56) References Cited

U.S. PATENT DOCUMENTS

2007/0163929 A1* 7/2007 Stiles, Jr. ............... F04B 49/20
210/97
2012/0000858 A1* 1/2012 Butler .................... C02F 1/003
210/90

(Continued)

FOREIGN PATENT DOCUMENTS

| WO | 2016102021 A1 | 6/2016 |
| WO | 2017031033 A1 | 2/2017 |
| WO | 2018191198 A1 | 10/2018 |

OTHER PUBLICATIONS

International Search Report and Written Opinion, International Application No. PCT/GB2019/053527, dated Jun. 23, 2020, 15 pages.

*Primary Examiner* — Mohamed Charioui
*Assistant Examiner* — Dacthang P Ngo
(74) *Attorney, Agent, or Firm* — Husch Blackwell LLP

(57) ABSTRACT

Systems and methods are provided, which relate to identification, troubleshooting, and maintenance/repair of water systems and water devices within such systems. A given water device may include an identifier which may be captured by an installation device when attempting to install the water device and sent to a remote server. The remote server may identify the water device and provide installation support, registration, and/or configuration of the water device. Configuration of the water device may be performed based on configurations of other highly-performing water devices that are similar to the water device, as identified by the server. Problem signatures associated with known possible problems that may arise within a water device may be (Continued)

generated and stored in memory, then may be referenced against real-time device operation data and/or configuration data of the water device in order to diagnose and recommend remediation of problems with the water device.

18 Claims, 18 Drawing Sheets

Related U.S. Application Data

(60) Provisional application No. 62/778,454, filed on Dec. 12, 2018.

(51) Int. Cl.
*G06Q 10/20* (2023.01)
*G06Q 30/016* (2023.01)
*G06Q 50/06* (2024.01)

(56) References Cited

U.S. PATENT DOCUMENTS

| | | |
|---|---|---|
| 2013/0221091 A1 | 8/2013 | Koo |
| 2018/0259133 A1* | 9/2018 | Ravid ................ G05B 13/026 |
| 2021/0216852 A1* | 7/2021 | Reece ................ G08B 29/20 |

* cited by examiner

PREDICTIVE AND PREVENTATIVE MAINTENANCE SYSTEMS FOR CONNECTED WATER DEVICES

CROSS-REFERENCE TO RELATED APPLICATIONS

This application is a continuation of International Application No. PCT/GB2019/053527, filed Dec. 12, 2019, which claims priority to U.S. Provisional Application No. 62/778,454 filed Dec. 12, 2018, which are incorporated by reference in their entirety for all purposes.

BACKGROUND

Water supplied to a home or business, whether through a well or a municipal water supply, may be used in a variety of applications such as drinking, cooking, showers, baths, toilets, pools, agricultural maintenance, and even heat. With conventional water systems and related devices, one may be able to determine the total amount of water used in their home or business by checking, in person, a meter at the main water feed. However, such conventional meters do not provide information as to how much water is used at each of the various taps and appliances within a home or business, do not provide information about water leaks that may have occurred, and the information that is provided is generally not accessible remotely. Thus, a home or business owner remains uninformed of any potential leaks, misuse, or overuse of water in their home or business, which may be financially and environmentally harmful. This is especially true for homes and business with water filtration systems and water softeners, where the waste of filtered or softened water is even more costly than the waste of otherwise untreated water.

Many homes and businesses may be equipped with water-related devices such as dehumidifiers, sump pumps, dishwashers, and washing machines, as well as chemical controllers, pumps, heaters, and skimmers for pools. Conventionally, such water-related devices include or are connected to one or more controllers through which a user may manually or automatically operate these devices. Some controllers, using computer programs and/or integrated circuits, can automatically detect conditions associated with the device and perform certain control functions in response to the conditions. Some devices and/or their controllers can connect via networking hardware to one or more communication networks, and can exchange data, including device condition information and control commands, with computing devices that are remote from the water-related device being controlled. However, functionality enabled in existing connected environments is limited, and typically a water-related device and/or its controller is not responsive to information associated with a device maintenance issue (i.e., by reporting or correcting the issue) until the issue has occurred and caused problems with the water-related device and/or the water system in general.

SUMMARY

In light of the deficiencies described above, new systems and methods for providing individuals with the ability to monitor and control the status of water systems and related devices inside and outside of a home or business, to rely on the systems to predict and help mitigate preventable maintenance issues, and to optimize the performance of these systems and devices and overall water use within the home or business are desirable.

In an example embodiment, a system may include a water device, a gateway device, an installation device, and a server. The water device may include an identifier. The gateway device may be communicatively coupled to the water device and to an electronic communications network. The installation device may be communicatively coupled to the electronic communications network. The server may be communicatively coupled to the gateway device via the electronic communications network. The server may include a processor and a memory device configured to store instructions which, when executed, may cause the processor to receive a communication indicating that the water device is being installed, receive an electronic representation of the identifier from the installation device, retrieve, from one or more data stores communicatively coupled to the processor, electronic records associated with the water device based on the identifier, determine a location associated with an installation site at which the water device is being installed, send installation support information to the installation device, obtain a configuration for the water device, and push the configuration to the water device via the gateway device.

In some embodiments, the identifier may be a physical identifier imprinted on the device. The physical identifier may be selected from the group consisting of a single-dimensional barcode, a multi-dimensional barcode, and a serial number.

In some embodiments, the installation device may be configured to capture an image of the physical identifier, perform an analysis of the image to determine the identifier, and generate the electronic representation of the identifier based on the analysis.

In some embodiments, the installation device may include a wearable augmented reality device and the installation support information may include a heads-up augmented reality display.

In some embodiments, to obtain the configuration for the water device, the instructions, when executed, may cause the processor to identify high-performing water devices associated with the server that are characteristically similar to the water device, retrieve, from a data source, sets of configuration data corresponding to each of the high-performing water devices, and determine candidate optimal values for each configurable parameter of the configuration based on the sets of configuration data.

In some embodiments, to determine the candidate optimal values, the instructions, when executed, may cause the processor to generate a feature vector comprising configurable parameter values for each configurable parameter represented in the sets of configuration data, and process the feature vector with a trained machine learning model to generate the candidate optimal values.

In some embodiments, to obtain the configuration for the water device the instructions, when executed, may cause the processor to generate one or more proposed device configurations based on the candidate optimal values, send the one or more proposed device configurations to be displayed at a user interface of the installer device, and receive, from the installer device, a selected device configuration corresponding to one of the proposed device configurations, wherein the configuration pushed to the water device is the selected device configuration.

In some embodiments, the instructions, when executed, may cause the processor to determine that the high-performing water devices are characteristically similar to the water devices by determining a water device type of the water device, determining that the high-performing water devices are of the water device type, determining environmental conditions of the water device and determining a plurality of environmental conditions of the high-performing water devices are each similar to the environmental conditions of the water system.

In some embodiments, the environmental conditions may include one or more of topological conditions, water quality, elevation, seasonal air temperature patterns, seasonal humidity patterns, seasonal weather patterns, or sunrise/sunset times.

In an example embodiment, a method may include steps of receiving, by a processor, real-time operation data from a controller of a water system, retrieving, by the processor, a health profile of the water system from a memory device coupled to the processor, the health profile including at least one signature, comparing, by the processor, the real-time operation data to a normal operation signature of the health profile to produce results, determining, by the processor based on the results, that the real-time operation data diverges from the normal operation signature based on one or more thresholds, and recording, by the processor, the real-time operation data in a log stored in the memory device.

In some embodiments, the method may include steps of retrieving, by the processor, a plurality of problem signatures from the memory device, comparing, by the processor, the real-time operation data to each of the plurality of problem signatures, identifying, by the processor, a problem signature of the problem signatures that substantially matches the real-time operation data, determining, by the processor, a problem associated with the problem signature, and causing, by the processor, a first alert to be sent to a user device associated with the water system, the first alert indicating that the problem has been detected in the water system.

In some embodiments, the problem signature may correspond to a future failure of a device of the water system, and the method may further include steps of determining, by the processor, that the water system is presently operating normally, and causing, by the processor, a second alert to be sent to the user device, the second alert suggesting that the device be repaired or replaced.

In some embodiments, the method may include steps of determining, by the processor, that the water system is presently operating abnormally, and automatically connecting, by the processor, the user device to a customer support service associated with the water system.

In some embodiments, the method may include steps of retrieving, by the processor, a plurality of problem signatures from the memory device, comparing, by the processor, the real-time operation data to each of the plurality of problem signatures, identifying, by the processor, that the real-time operation data does not substantially match any of the plurality of problem signatures, and monitoring, by the processor, the water system.

In some embodiments, the method may include steps of determining, by the processor based on the monitoring of the water system, that a problem occurs in a device of the water system within a predetermined time period, and adding a problem signature corresponding to the real-time operation data to the plurality of problem signatures stored in the memory device.

In some embodiments, the method may include steps of determining, by the processor based on the monitoring of the water system, that no problem occurs in a device of the water system within a predetermined time period, and adding a normal operation signature corresponding to the real-time operation data to the health profile.

In an example embodiment, a system may include a filtration system and a communication system. The filtration system may include a filter and a controller. The communication system may include a gateway device and a server. The gateway device may be communicatively coupled to the controller and to an electronic communications network. The server may be coupled to controller via electronic communications network and gateway device. The server may include a processor and a memory device configured to store instructions which, when executed, may cause the processor to receive data from the controller, determine a pressure value based on the data, the pressure value corresponding to a pressure at the filter, retrieve a signature from the memory device, the signature defining a maximum pressure for the filter and a threshold percentage, determine a percentage of the maximum pressure represented by the pressure value, determine that the percentage exceeds the threshold percentage, and cause an alert to be sent to a user device associated with the filtration system, the alert indicating that the filter should be backwashed.

In some embodiments, the instructions, when executed, may cause the processor to automatically backwash the filter by reversing flow of water through the filter for a predetermined time period.

In some embodiments, the instructions, when executed, may cause the processor to determine a power consumption of the filtration system based on the data, retrieve a correlation between power consumption and pressure from memory, and determine the pressure value based on the filter power consumption and the correlation.

In some embodiments, the instructions, when executed, cause the processor to determine a power consumption of the filtration system, determine a filter type of the filtration system, determine a region in which the filtration system is located, identify high-performing filtration systems of the filter type that are located in the region, and determine a loading threshold for optimum power consumption based on performance data of the high-performing filtration systems. The maximum pressure may be determined based on the loading threshold.

In some embodiments, the instructions, when executed, may cause the processor to cause the filtration system to perform a first diagnostic check of the filter, determine that a filter change has been performed since a second diagnostic check immediately preceding the first diagnostic check was performed, determine that an elapsed time between two most recent filter changes is less than a predetermined threshold, and cause a filter change alert to be sent the user device indicating that the filter is being changed too often.

In some embodiments, the instructions, when executed, may cause the processor to cause the filtration system to perform a diagnostic check of the filter, determine, based on results of the diagnostic check, that a mechanical failure of the filtration system has occurred, and cause a mechanical failure alert to be sent to the user device indicating that the filter should be replaced immediately due to mechanical failure.

In an example embodiment, a system may include a pump and a communication system. The pump may include a controller and a vibration sensor coupled to the controller and configured to generate vibration sensor data. The communication system may include a gateway device and a server. The gateway device may be communicatively coupled to the controller and to an electronic communications network. The server may be communicatively coupled to controller via the electronic communications network and gateway device. The server may include a processor and a memory device configured to store instructions which, when executed, cause the processor to receive the vibration sensor data from the controller, generate a frequency spectrum that includes frequencies and amplitudes represented in the vibration sensor data, retrieve failure signatures from the memory device of the server, the failure signatures comprising frequency spectra associated with a plurality of pump component failure types, compare the frequency spectrum to each of the failure signatures, identify a failure signature of the failure signatures that at least approximately matches the frequency spectrum, and remediate a component failure associated with the failure signature.

In some embodiments, in order to remediate the component failure, the instructions, when executed, may cause the processor to send an alert to a user device associated with the pump, the alert comprising a warning defining the component failure.

In some embodiments, the alert may further include recommended guidance for correction of the component failure.

In some embodiments, in order to remediate the component failure, the instructions, when executed, may cause the processor to schedule, via electronic communication with a service provider, repair of the pump to correct the component failure.

In some embodiments, the component failure may be selected from a group consisting of a plugged impeller, a physically damaged impeller, a roller bearing seizure, a vane pass, a vane blockage, and a motor winding failure.

In an example embodiment, a method may include steps of receiving, by a server from a user device via an electronic communications network, information identifying a problem with a water device within a water system, obtaining, by the server from a memory device, water system data corresponding to the water device, configuring, by the server, a water system simulation based on the water system data, and executing, by the server, the water system simulation to determine whether the water system simulation mitigates the problem.

In some embodiments, the water system data may include a device configuration of the water device and current operating conditions of the water system.

In some embodiments, the method may include steps of determining, by the server, that the water system simulation mitigates the problem, sending, by the server, a notification to the user device indicating a configuration change of the water device, and performing, by the server, the configuration change by sending an updated device configuration to the water device.

In some embodiments, the method may include steps of determining, by the server, that the water system simulation does not mitigate the problem, and iteratively applying, by the server, alternative solutions to the water system simulation by modifying, based on the alternative solutions, configuration parameters of the water system simulation until the water system simulation mitigates the problem.

In some embodiments, the method may include steps of determining, by the server, that the water system simulation does not mitigate the problem, identifying, by the server, a mechanical problem with the water system, sending, by the server via the electronic communications network, an alert to the user device indicating that service of the water system is required, and scheduling, by the server via electronic communication with a service provider, repair of the water system.

DESCRIPTION OF THE DRAWINGS

The invention will be better understood and features, aspects and advantages other than those set forth above will become apparent when consideration is given to the following detailed description. Such detailed description makes reference to the following drawings.

DETAILED DESCRIPTION

Figure 1:
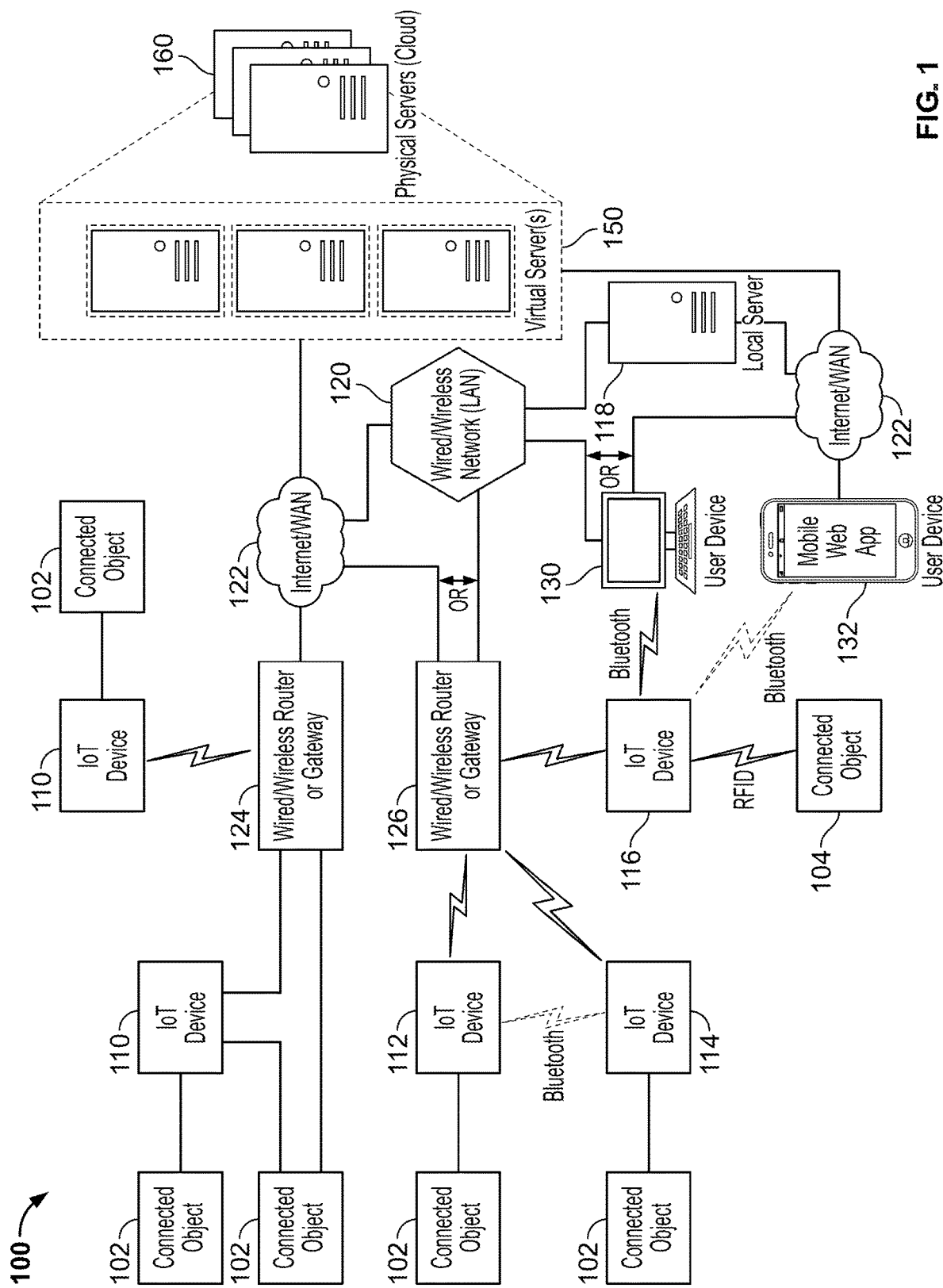
FIG. 1 is a diagram of a computing environment for deploying Internet of Things (IoT) devices in accordance with various embodiments of the invention.

Before any embodiments are described in detail, it is to be understood that the invention is not limited in its application to the details of construction and the arrangement of components set forth in the following description or illustrated in the following drawings, which is limited only by the claims that follow the present disclosure. The invention is capable of other embodiments, and of being practiced, or of being carried out, in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following description is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. Skilled artisans will recognize the examples provided herein have many useful alternatives and fall within the scope of embodiments of the invention.

Additionally, while the following discussion may describe features associated with specific devices, it is understood that additional devices and or features can be used with the described systems and methods, and that the discussed devices and features are used to provide examples of possible embodiments, without being limited.

The invention is a communication system using computer-implemented methods to provide an infrastructure of a computing environment in which connected devices can communicate electronically to exchange, aggregate, analyze, and react to data describing water usage and device operations within one or more residential water systems. The connected devices may be, or may interface with, water system components such as valves, switches, manifolds, pumps, sensors, and integrated components such as water softener systems, filtration systems, and water-using appliances. The infrastructure can facilitate communications between connected devices that communicate using different protocols/formats (e.g., devices from different manufacturers); further, the infrastructure can facilitate aggregation and normalization of communications and other data generated by such devices, enabling a more holistic data-based view of water system operations, conditions, and history. The communication system can analyze aggregated information to identify problems in the water system and issue commands to connected devices in order to resolve and/or remediate the problems; for example, the system can identify a problem in a first water subsystem (e.g., a water softener system) and, using the provided algorithms, cause components of a second water subsystem (e.g., a water point-of-entry (POE) system or a filtration system) to perform functions that address the identified problem. The system can include various application programming interfaces (APIs) for connecting devices to the infrastructure, specifying parameters for data collection and analysis, receiving and responding to reports and/or alerts, and performing other administrative functions associated with the residential water system(s).

FIG. 1 illustrates an example computing environment 100 for wired and/or wireless monitoring and control of electronic and mechanical devices that are deployed in a physical environment, such as a home or residential environment, a commercial building, a farm or other agricultural facility, industrial environments such as factories and refineries, and any other physical environment where it is feasible and beneficial to deploy so-called "smart" devices, which are natively or retroactively enabled to connect to the internet or another wide-area network (WAN) 122 to send and receive electronic data. In particular, such devices become "connected objects" 102, 104 in the computing environment 100 by interfacing with an internet enabled device, referred to herein as an "Internet-of-Things" (IoT) device, in accordance with various embodiments described herein. Other significant entities, such as a person, an animal (e.g., a farm animal), a pipe or pipeline, a body of water, or the physical environment itself, may become a connected object 102, 104 in the computing environment 100 by interfacing with an IoT device. The interface or connection between a connected object 102, 104 and an IoT device 110, 112, 114, 116 may depend on several factors, non-limiting examples of which include: whether the object is electronic, mechanical, organic, etc.; whether the object is "natively" connected, having the IoT device or another transmitter built-in, or the IoT device is added or connected to the object to make the object "connected;" whether the IoT device connects directly to the connected object, and/or connects to other objects or must be disposed in a particular location (e.g., to deploy a sensor); and, whether the IoT device sends data to the connected object, receives data from the connected object, or both. Example interfaces/connections are described below with respect to FIGS. 1 and 2.

Each of the IoT devices 110-116 may be embedded with electronics, software, sensors, actuators, and network connectivity, either within the device itself or in cooperation with connected servers 118, 160, which enable the IoT devices 110-116 and their embedded software to collect and exchange data. In some embodiments, various IoT devices 110-116 in an environment 100 may send and/or receive data transmissions over a WAN 122, a local area network (LAN) 120, and/or another communication network using any suitable communication protocol. For example, the IoT devices 112-116 may communicate over the LAN 120 with a local server computing device 118, such as in a private network where transmitted data to/from the IoT devices is isolated from the internet or another WAN 122, at least until the data is processed by the local server 118. In some embodiments, (a) local server(s) 118 may be operated at the same location as the IoT devices 112-116, such as at a residence or in an office building. A user device 130 may also be connected to the LAN 120 in order to access the IoT data as described below; alternatively, IP connectivity may be used, connecting the LAN 120 and/or the local server(s) 118 to the Internet or another WAN 122, so that local and/or remote user devices 130, 132 can access the local server 118.

In still other embodiments, one or more of the IoT devices 110-116 may connect, directly or through a router, gateway, base station, etc. (shown as wired/wireless router or gateway 124, 126), to the WAN 122 in order to communicate with cloud-based computing resources. Such an environment provides a bi-directional, direct-to-cloud communication between the IoT devices 110-116 and one or more application and/or hosting servers. In some embodiments, IoT devices 110-116 may communicate with and directly use the resources of one or more physical, remote server computing devices 160, which may be deployed in one or more data centers (for example) in a particular geographic location or dispersed throughout several geographic locations. In other embodiments, the remote physical servers 160 may cooperate to provide virtualized computing resources that can be allocated for use by, for example, an authorized user of a computing resource service provider. Thus, a user that controls, or provides services for, the IoT devices 110-116 may configure and deploy one or more virtual servers 150 that are allocated the use of certain physical computing resources, such as processor cycles, memory, data storage, etc., of the physical servers 160; the IoT devices 110-116 may, in turn, be configured to connect to the virtual servers 150. For example, an IoT device 110 may be programmed to connect to an IP address associated with an endpoint that connects a virtual network adapter of the servers 150 to a physical network adapter of the physical servers 160. The virtual servers 150, or the computing resource service provider's computing environment in which the virtual servers 150 are deployed, may provide other computing resource services for implementing an IoT platform as described further below.

Given this bi-directional, cloud-based environment, each IoT device 110-116 may be deployed as a direct-to-cloud IoT device. In other words, the deployment of multiple IoT devices 110-116 in a LAN-based or cloud-based environment provides for an internetworking of physical devices, connected devices, and/or smart devices at the network level. Various communication protocols between components may be used, depending on the types of devices connecting to each other and the type, amount, and frequency of data being exchanged. Non-limiting examples of connection protocols include: an IoT device 110, such as a base station or fixture, may have a wired (e.g., CAT5, USB) connection to a router 124 and may use any TCP/IP protocol for wired connections; or, an IoT device 110 may have a wireless connection to a router 124, and may use wireless TCP/IP protocols such as WiFi or MQTT; an IoT device 112 may communicate directly with another IoT device 114 using the above wireless protocols or other suitable protocols such as Bluetooth; IoT device 110-114 connections to a connected object 102 may be wired, or may be indirect based on a sensor interface; or, an IoT device 116 may connect wirelessly to the connected object 104, using a suitable protocol such as RFID for an RFID-enabled connected object 104. More generally, a communication network can include a Wi-Fi network (e.g., an 802.11x network, which can include one or more wireless routers, one or more switches, etc.), a peer-to-peer network (e.g., a Bluetooth network, a ZigBee® network, a Z-Wave® network, a proprietary RF connection, etc.), a cellular network (e.g., a 3G network, a 4G network, a 5G network, etc., complying with any suitable standard, such as CDMA, GSM, LTE, LTE Advanced, WiMAX, etc.), a wired network, an EnOcean® network, etc. In some embodiments, the communication network can be a LAN, a WAN, a public network (e.g., the Internet), a private or semi-private network (e.g., a corporate or university intranet), any other suitable type of network, or any suitable combination of networks. Communications links between the pressure switch 201, the router/modem 124, 126, the cloud based server 150, and/or the internet enabled device 110 can each be any suitable communications link or combination of communications links, such as wired links, fiber optic links, Wi-Fi links, Bluetooth links, cellular links, etc.

A user may operate one or more client computing devices 130, such as a desktop or laptop computer, or a mobile computing device 132 such as a phone or tablet, running client software that enables the device 130, 132 to access an interface to the IoT platform provided by a server 118, 150, 160. Each of these client computing devices 130, 132 may include at least one processor executing specific computer-executable instructions (i.e., the running software) stored in a memory coupled to the client computing device. The user may access and run a client-based software such as a web browser or web application, in order to request access to the system level software and/or the GUI (e.g., by entering a Uniform Resource Locator (URL) for a web page including the GUI). This request may identify the IP address for the server(s), as well as instructions to generate and render the GUI and/or web page for the system level software. The server(s) may execute one or more software instructions to generate and render the GUI, and transmit it to the client computing device 130, 132 for display. The server(s) 118, 150, 160 may include components and data processing capabilities used to host and run software applications that allow for bi-directional communication between each IoT device 110-116 and the server(s). For example, the server(s) may host the customizable software that is deployed to, and installed on, each IoT device 110-116. The server(s) may also run the software and protocols for other services used by the IoT platform, as well as for the interface to the client computing devices 130, 132. Example uses of the user interface to the IoT platform include configuring and deploying server resources, configuring and deploying software and settings for IoT devices, obtaining and/or reviewing data collected by the server(s) from the IoT devices 110-116 (e.g., viewing current status), performing and/or reviewing data analysis, accessing particular IoT devices 110-116, etc.

Figure 2:
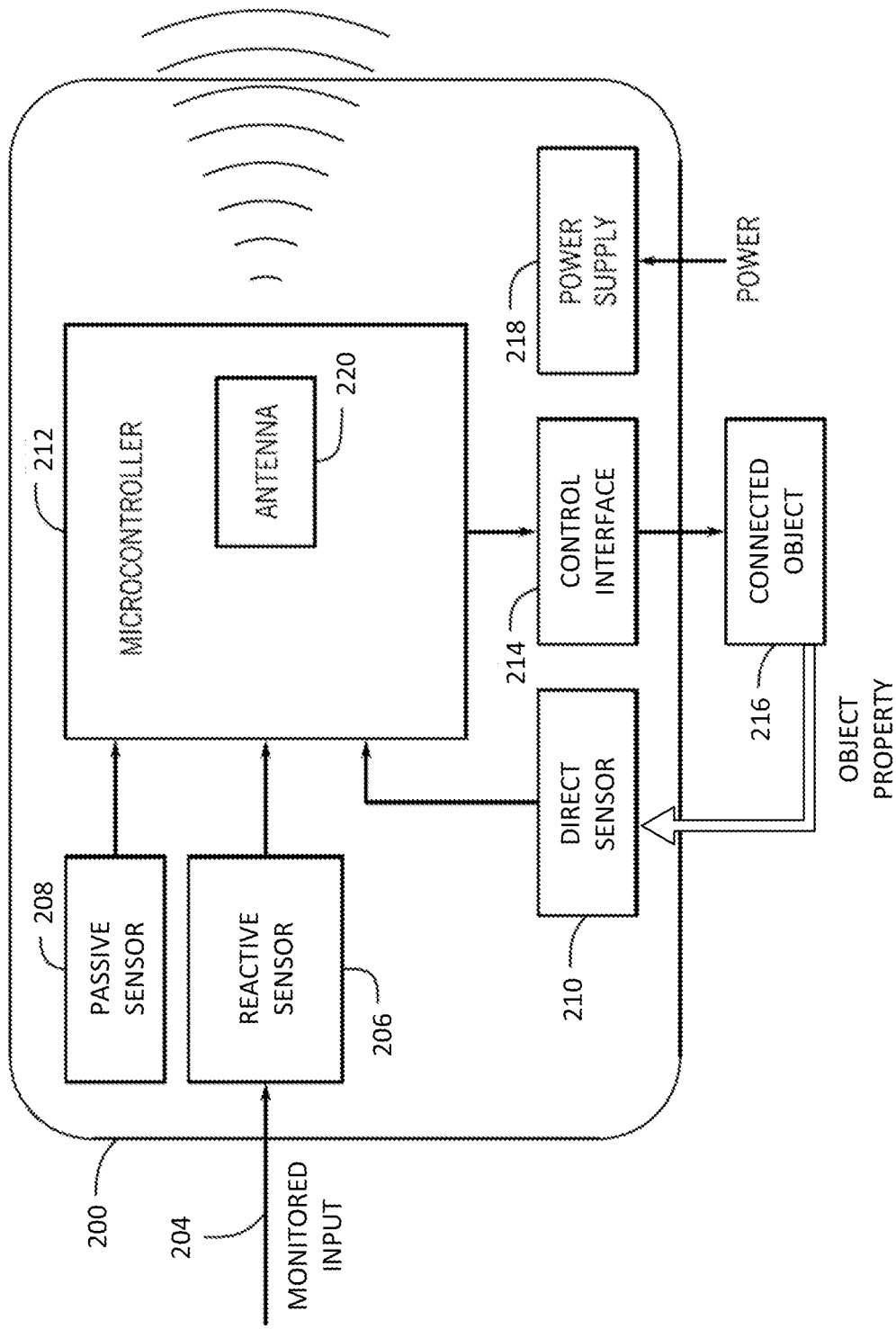
FIG. 2 is a block diagram of an example embodiment of an IoT device.

FIG. 2 shows the internal (i.e., partially or fully inside a housing) components of an example IoT device 200 in accordance with some embodiments of the invention (e.g., as an example of one or more of the IoT devices 110-116 of FIG. 1). As shown in FIG. 2, an IoT device 200 may serve to both collect data associated with a connected object 216, and control one or more operations and/or operating parameters of the connected object 216; in other embodiments, an IoT device for the connected object 216 may only collect and report data, or only control operations/configurations of the connected object 216. To collect data associated with the connected object 216, the IoT device 200 may include, connect to, or communicate with one or more of several different types of sensors. Non-limiting examples of types of sensors that may cooperate with or be incorporated in the IoT device 200 include reactive sensors 206, passive sensors 208, and direct sensors 210, among others. A reactive sensor 206 can detect and report certain monitored inputs 204 on the connected object 216 or the IoT device 200 itself; examples include a pressure transducer that detects a button press or a fluid pressure level, a moisture sensor, a flow rate sensor, a photodiode or other light receptor, and a sample analyzer that collects a sample (e.g., of water in which the sensor 206 is submerged) and measures a property of the sample (e.g., total dissolved solids; note that a sample analyzer may also be a direct sensor 210 if the connected object 216 is a body of water (as opposed to a water filter in the body of water)). A passive sensor 208 can detect environmental and other ambient properties; examples include an ambient temperature sensor, an ambient light sensor (e.g., for sunlight), a humidistat, etc. A direct sensor 210 can be connected to the connected object 216, or in communication therewith, or otherwise oriented to monitor one or more specific properties of the connected object 216; examples include a thermistor for monitoring the temperature of the connected object 216, a biometric sensor, a sample analyzer (e.g., of water at the inlet or outlet of a water filter), a current sensor, a speed sensor, etc.

Any of the sensors 206-210 may be configured to monitor a corresponding property continuously, at intervals, or randomly, and/or may "listen" for inputs and react when they are detected. Sensors 206-210 may also continuously generate data, or may only generate data at intervals, or only when the monitored property meets one or more particular thresholds; the generated data may describe the state of the property being measured. The sensors 206-210 may send the data to a microcontroller 212 of the IoT device 200. A microcontroller 212 may be any suitable microprocessor, including single- and multi-core CPUs, wireless-enabled microcontrollers, and other known microcontrollers having the processing power to receive data from the sensors and transmit the data to a receiving device such as a gateway/router or a local or cloud server. In some embodiments, the microcontroller 212 can be configured to itself act as a wireless gateway module. For example, the microcontroller 212 can be implemented using a single-chip wireless microcontroller, such as the CC3200MOD microcontroller available from Texas Instruments® (of Dallas, Tex.), which can include a CC3200R1M2RGC microcontroller from Texas Instruments®. A microcontroller 212 may further have sufficient computing power to receive control commands from a router/gateway, a server, another IoT device, or a client computing device, and deliver the control commands to the connected object 216 as described below. The microcontroller 212 may further have sufficient resources to store and execute data analysis algorithms, such as processing methods that enable the microcontroller 212 to evaluate sensor 206-210 data and issue control commands to the connected object 216 based on the evaluated data. For example, the microcontroller 212 and/or the IoT device 200 can include any suitable volatile memory, non-volatile memory, storage, or any suitable combination thereof. For example, the memory can include RAM, ROM, EEPROM, one or more flash drives, one or more hard disks, one or more solid state drives, one or more optical drives, etc. In some embodiments, the memory can have encoded thereon a computer program for controlling operation of a hardware processor (e.g., microcontroller 212) in the form of computer executable instructions that, when executed by the hardware processor, cause the hardware processor to perform one or more actions as indicated by the instructions.

In some embodiments, the microcontroller 212 or the IoT device 200 can include one or more antennas 220 configured to send and/or receive wireless signals, such as signals for communicating over Wi-Fi, Bluetooth, ZigBee, Z-Wave, free-space optical, etc. In some such embodiments, the antenna(s) 220 can receive signals from the wireless gateway module, and can transmit the signals to the microcontroller 212 for processing into commands. Additionally or alternatively, the antenna 220 can send signals generated by the microcontroller 212 to the wireless gateway/router. In some embodiments, the antenna(s) 220 can be an integral part of the microcontroller 212. Alternatively, in some embodiments, the antenna 220 can be mounted to a printed circuit board (PCB) and electrically connected to the microcontroller 212, and/or can be mounted to a housing of the IoT device 200. In some embodiments, the IoT device 200 can communicate with server(s) and/or other IoT devices in the network using the antenna(s) 220. For example, the IoT device 200 can use the antenna(s) 220 to communicate using a direct connection (e.g., over a Bluetooth connection, over a direct Wi-Fi connection such as an ad hoc Wi-Fi connection or Direct Wi-Fi connection), and/or an indirect connection (e.g., over a LAN, over a mesh network, etc.).

In some embodiments, the IoT device 200 can include a control interface 214 that enables the IoT device 200 to control operations and/or to change configuration settings or other data of the connected object 216. The control interface 214 may include any suitable electrical and/or electronic components and connections needed to enable the desired control of the connected object 216. For example, a control interface 214 for a water pump can connect to the power supply circuit of the pump and, based on signals from the microcontroller 212, selectively provide power for operation of the pump. In this example, the control interface 214 or the IoT device 200 can be connected to both a source of power (e.g., a household electrical grid) and wires/cable(s) connected to the pump, and can either provide power to the pump or inhibit power from being provided to the pump. The microcontroller 212 may provide the appropriate format of signal to cause the control interface 214 to apply the desired control. For example, in an analog environment such as the pump power control, the control interface 214 may be a series of switches, and the microcontroller 212 may send one or more signals that open or close the switches as needed to apply the desired power setting. In another example, the connected object 216 may be a digital device, and the control interface 214 may be an application programming interface (API) that converts the microcontroller 212 control signals to function calls that the control interface 214 sends to the connected object 216 to change its operating parameters.

In some embodiments, the IoT device 200 can include a power supply 218 that can provide power for operation of the microcontroller 212 and/or any other suitable low voltage devices within the IoT device 200. For example, the IoT device 200 can receive input power at 230 V and 60 Hertz (Hz), which is not suitable for operation of the microcontroller 212, which is typically a low voltage device (e.g., operating at 3.3 V DC, 5 V DC, 12 V DC, 24 V DC, etc.). In some embodiments, power supply 218 can receive AC power (e.g., at 230 V, 60 Hz), convert the AC power to low voltage DC power, and distribute power to one or more other components of the IoT device 200, such as the microcontroller 212. In other embodiments, the power supply 218 may be one or more onboard batteries (e.g., AAA batteries) contained within the housing of the IoT device 200. The power supply 218 may provide power in a variety of other ways, for example, from harvested energy, wirelessly through inductive coupling or resonant inductive coupling, or in any other known way. In some embodiments, the power supply 218 or another energy storage device such as a battery, an ultracapacitor, a fuel cell, etc., can provide supplemental power to continue to operate the IoT device 200 when an external power supply is interrupted or a primary battery fails.

Figure 3:
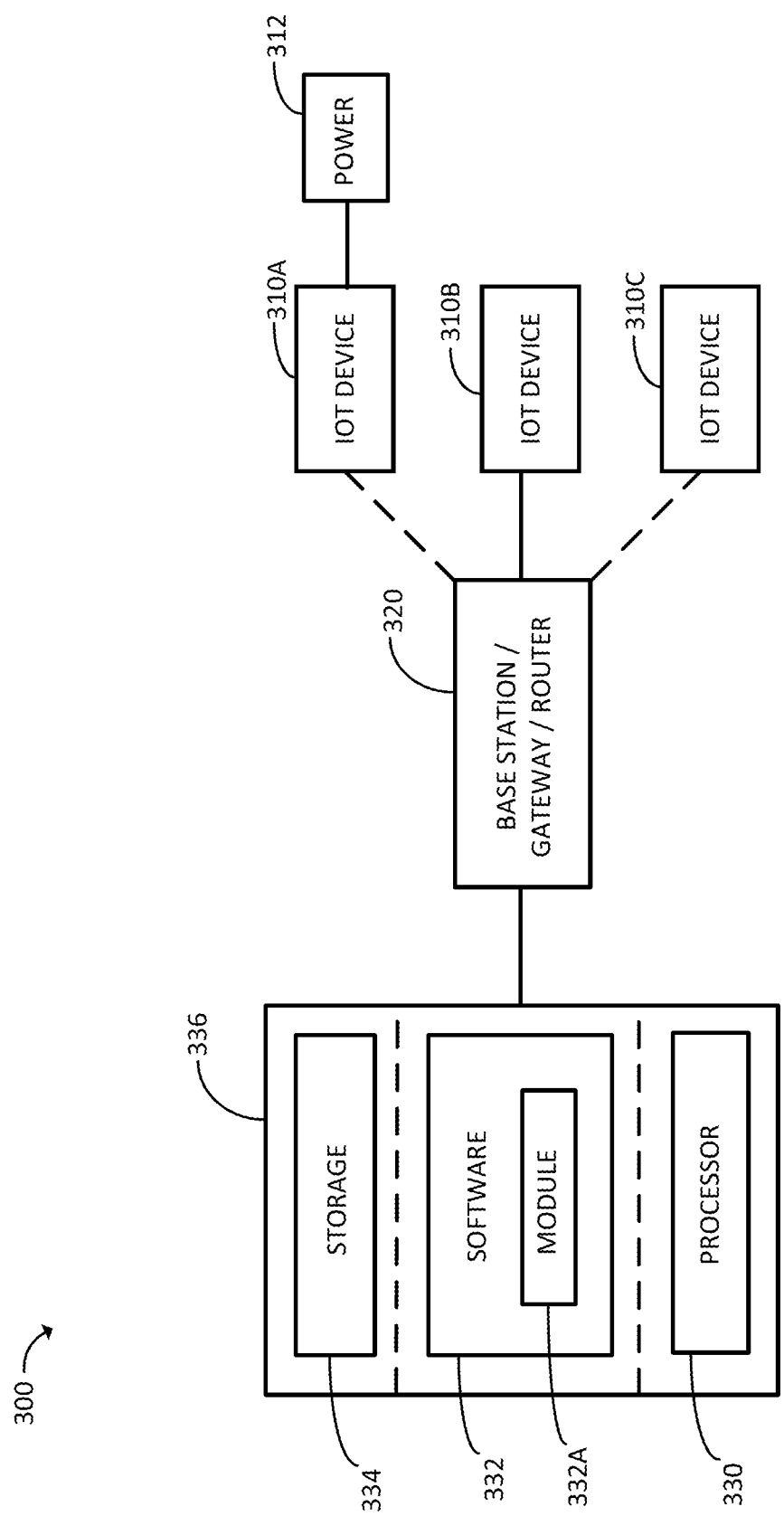
FIG. 3 is a block diagram of an example embodiment of a system in accordance with embodiments of the invention, including a server and IoT devices.

FIG. 3 is a block diagram 300 that illustrates additional details of a communication system. The block diagram 300 includes IoT devices 310A-C, a power source 312, a base station, router, or gateway 320, a server 336, a processor 330, software 332, and storage 334.

As described above, the IoT devices 310 may sense data about the environment and/or users and/or a connected object; an IoT device 310A-C can provide raw sensor data and/or processed sensor data to server 336 via gateway 320. Additionally, or alternatively, the IoT devices 310 may receive data, such as control signals generated by the server 336 or a client computing device or sensor data from other IoT devices, from the server 336 via the gateway 320. The IoT devices 310 may communicate with the gateway 320 through a wired (e.g., IoT device 310B) or wireless connection. The IoT device 310B may also receive power through its wired connection with the gateway 320; the IoT device 310A receives power from the power source 312; the IoT device 310C does not have a separate power source and may instead rely on piezoelectric technology or other technology to provide sufficient energy for transmitting information to the gateway 320. Depending on the embodiment, the IoT devices 310 may employ a range of technologies. For example, the IoT devices 310 may detect heat or pressure changes, may detect touch, or may detect changes in a variety of health indicators. Certain IoT devices 310 may rely on Bluetooth, iBeacon, or near field communication technology. In some embodiments, the IoT devices 310 may include an accelerometer. The IoT devices 310 may be present in a variety of locations within an organization's environment. The IoT devices 310 may be embedded in an article of furniture, such as a chair or table, and/or may be embedded in or coupled to a wall, partition, ceiling, of floor. The IoT devices 310 may also be associated with a user, present, for example, in a user's identification badge or mobile communication device (e.g., a smartphone, in a wrist worn device, etc.).

The gateway 320 relays information to the server 336 and may be coupled to the server 336 via a LAN or wide area network (WAN). The gateway 320 may be any device suitable to receive, aggregate, and/or relay information from the IoT devices 310A-C, including, for example, a wireless router or a Room Wizard™. The gateway 320 may include existing technology affiliated with other services of an organization or may be provided to an organization specifically for use with the IoT devices 310. For example, the gateway 320 may be provided in the form of a base station comprising computing resources, such as a processor, memory, and specific program instructions (e.g., software or firmware) that the processor executes to communicate with and/or monitor deployed IoT devices 310. In some embodiments, more than one gateway 320 may be used to optimize performance. For example, the number and/or positioning of gateways may depend on the number and/or positioning of IoT devices 310.

As information from one or more IoT devices 310 reaches server 336, software 332 may determine how the information is processed. In this embodiment, a software module 332A can configure a commands processor 330 to perform a variety of tasks, such as processing collected data from the IoT devices 310 and/or sending control signals to IoT devices 310 for controlling the corresponding connected object(s). For example, processor 330 may analyze incoming data related to a user's location, orientation, or interaction with a client computing device. The processor 330 may make determinations or conclusions about a user or group of users, or an object or group of objects, or other environmental or input conditions, based on incoming data. The processor 330 may also relay information or send conclusions to a user or group of users. Incoming data from the IoT devices 310, other incoming data or inputs, conclusions, and other data may be stored in storage 334.

In various embodiments, the server 336 may be a virtual server or may represent a cluster of servers. Some or all portions of the block diagram may be located physically on site at an organization's location and some or all may be stored remotely in the cloud. For example, in one embodiment, server 336 may physically include the processor 330 while the software 332, the software module 332A, and the storage 334 are located in a remote or cloud server. In another embodiment, only the software 332 or the storage 334 may be located in a remote or cloud server. The software module 332A may additionally communicate with a variety of other servers, processors, hardware, and software located in the server 336 or in other servers or other locations. For example, the software module 332A may communicate with a second server to ensure that a user's calendar or reservation information is up-to-date.

Figure 4:
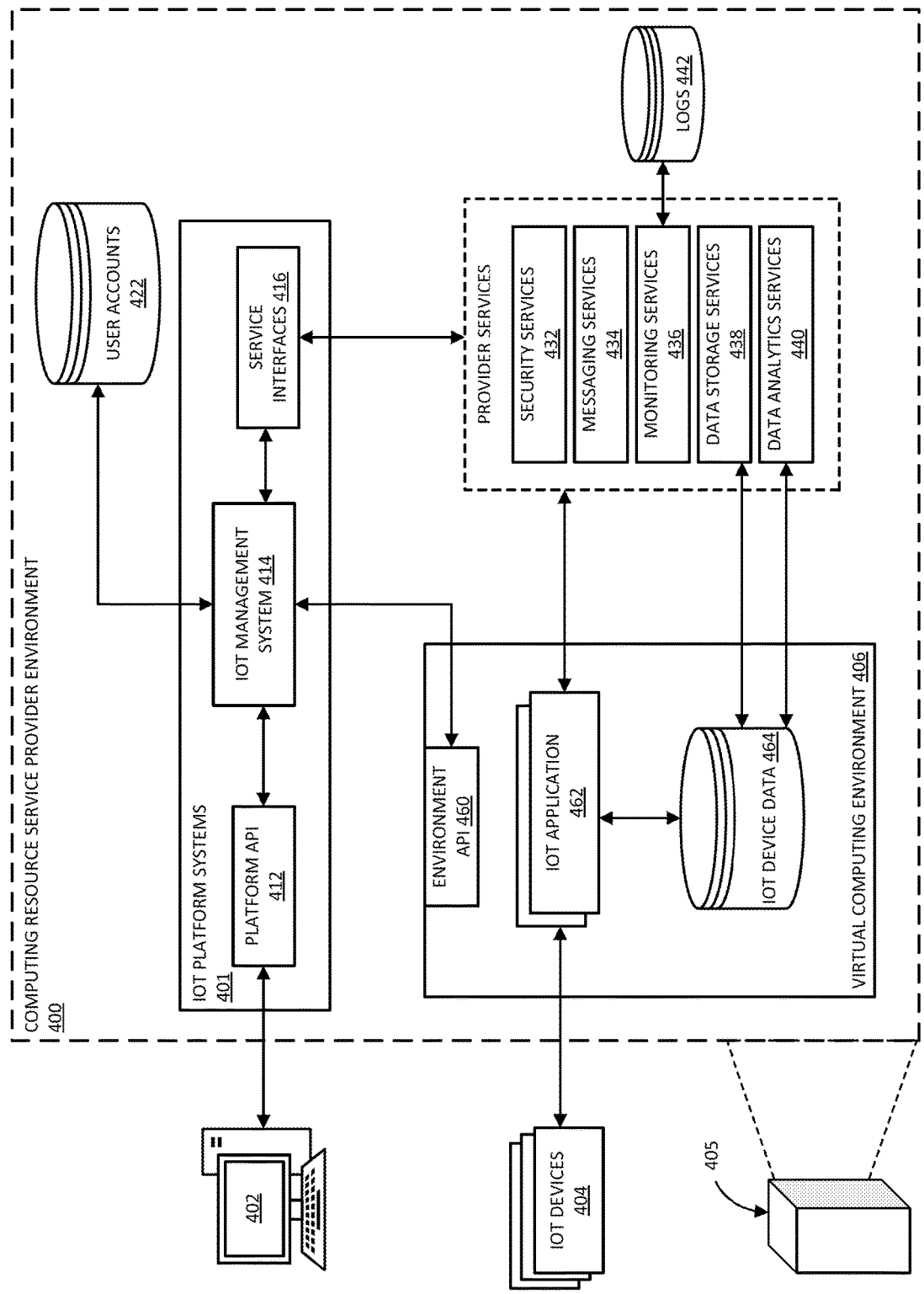
FIG. 4 is a block diagram of an example embodiment of another computing environment in accordance with some embodiments of the invention.

Referring to FIG. 4, embodiments of the invention may operate within or upon computing systems (e.g., the hardware computing device 405) of a computing resource service provider that provide a computing environment 400 accessible, via one or more computer networks, by users of user computing devices 402 and by one or more IoT devices 404 configured and deployed as described above. The computing environment 400 may, for example, be provided by the virtual servers 150 and/or the physical servers 160 of FIG. 1 (i.e., computing device 405 may be one of the physical servers 160 of FIG. 1). That is, where FIG. 1 illustrates the conceptual operation of the present systems and methods in interaction, via the computing devices 130, 132, with a "client," or administrator of the IoT devices 110-116 deployed in a computing environment 100, FIG. 4 illustrates a computing architecture in which a client may access the computing systems of the computing resource service provider environment 400 (e.g., using the client's user account credentials) using a computing device 402 to connect to one or more user interfaces provided (e.g., as websites, web applications, command consoles, APIs, etc.) in the environment 400. The user interfaces may enable the client to manage virtual computing resources allocated to the client's account and configured to implement an IoT platform for the client's IoT devices 404.

The computing resource service provider environment 400 may include one or more systems 401 that cooperate to enable deployment of the IoT platform using a customized configuration for a particular user. The systems 401 may include a platform API 412 to which the client, via computing device 402, connects in order to configure, deploy, manage, and otherwise interact with the client's IoT platform. In some embodiments, the platform API 412 provides secure access to an IoT management system 414 that includes or accesses services and data needed to interact with an IoT platform, an IoT application 462, and/or IoT devices 404 that are deployed within or connect to the client's virtual computing environment 406, described below. In some embodiments, the IoT management system 414 may access one or more user account data stores 422 that contain user account information and other private information associated with the client's user account. For example, the IoT management system 414 may store and retrieve configuration settings for particular IoT devices 404 and/or IoT applications 462 that the client has previously submitted.

The computing resource service provider implements, within its computing environment 400, at least one virtual computing environment 406 in which users may obtain virtual computing resources that enable the users to run programs, store, retrieve, and process data, access services of the computing resource service provider environment 400, etc. The virtual computing environment 406 may be one of any suitable type and/or configuration of a compute resource virtualization platform implemented on one or more physical computing devices. Non-limiting examples of virtual computing environments 406 include data centers, clusters of data centers organized into zones or regions, a public or private cloud environment, etc. The virtual computing environment 406 may be associated with and controlled and managed by the client. In some embodiments, the virtual computing environment 406 of a particular client may be dedicated to the client, and access thereto by any other user or service of the computing resource service provider environment 400 prohibited except in accordance with access permissions granted by the client. In some embodiments, an environment API 460 may serve as a front-end interface that provides access to the resources of the virtual computing environment 406 based on whether or not requests to access the environment 406 are authorized. For example, the IoT management system 414 may deploy IoT platform-related resources, push configuration changes, and request information about such resources via calls to the environment API 460. Additionally or alternatively, other channels, such as TLS-encrypted data channels, may be enabled to allow data to enter or exit the environment 406 without passing through the environment API 460. For example, an IoT application 462 in the environment 406 may be configured to communicate directly with IoT devices 404 and/or certain services in the computing resource service provider environment 400.

In some embodiments, a client's IoT platform may be deployed by installing one or more IoT applications 462 into the client's virtual computing environment 406. An IoT application 462 may be a software program or suite of software programs including program instructions that enable a processor executing the IoT application 462 to communicate with deployed IoT devices 404, sending and/or receiving data, processing data, and making decisions in accordance with the desired goals and functions of the IoT platform. For example, the IoT application 462 may cause the processor to receive sensor data from the IoT devices 404, process the data to determine whether to take any actions, and then perform any identified action such as reporting the status of connected objects to the client, sending new commands to one or more of the IoT devices 404, storing data (e.g., in an IoT device data store 464), etc. The IoT application may be executed within virtual computing resources allocated to the client's virtual computing environment 406, such as one or more virtual machine instances or logical container instances configured to provide virtualized physical computing resources for the purpose of performing the IoT application's functions. For example, a virtual machine instance may be launched from a software image including the configuration information (e.g., operating system, memory, disk storage, network interface configuration, and software program code) needed to provide an execution environment for the IoT application 462.

The computing resource service provider environment 400 may include data processing architecture that implements systems and services that operate "outside" of any particular user's virtual computing environment and perform various functions, such as managing communications to the virtual computing environments, providing electronic data storage, and performing security assessments and other data analysis functions. These systems and services may communicate with each other, with devices and services outside of the computing resource service provider environment 400, and/or with the virtual computing environments. Services depicted in the figures as inside a particular virtual computing environment 406 or outside all virtual computing environments may be suitably modified to operate in the data processing architecture in a different fashion than what is depicted. The IoT management system 414 may include or communicate with one or more service interfaces 416, such as APIs, that enable the IoT management system 414 and/or other components of a deployed IoT platform (e.g., an IoT application 462) to interact with one or more of these systems and services. Non-limiting examples of provider services that may be invoked or accessed to work in conjunction with the IoT platform include: security services 432 that maintain and apply security policies, access controls, and the like, encrypt and decrypt information, create secure transmission (e.g., TLS) channels, etc.; messaging services 434 that transmit triggering events and other notifications between subscribing users and services, and or/provide queueing services for prioritizing synchronous and asynchronous operations (e.g., API calls); monitoring services 436 that monitor network activity and computing resource usage and generate logs 442 of activity; data storage services 438 that maintain distributed storage devices, databases, etc., and that may maintain and/or obtain data stored in an IoT device data store 464; and, data analytics services 440 that may collect data (e.g., aggregated sensor data) and perform analytics on the data, such as machine learning, trend analysis, general monitoring/alerting, etc.

Figure 5:
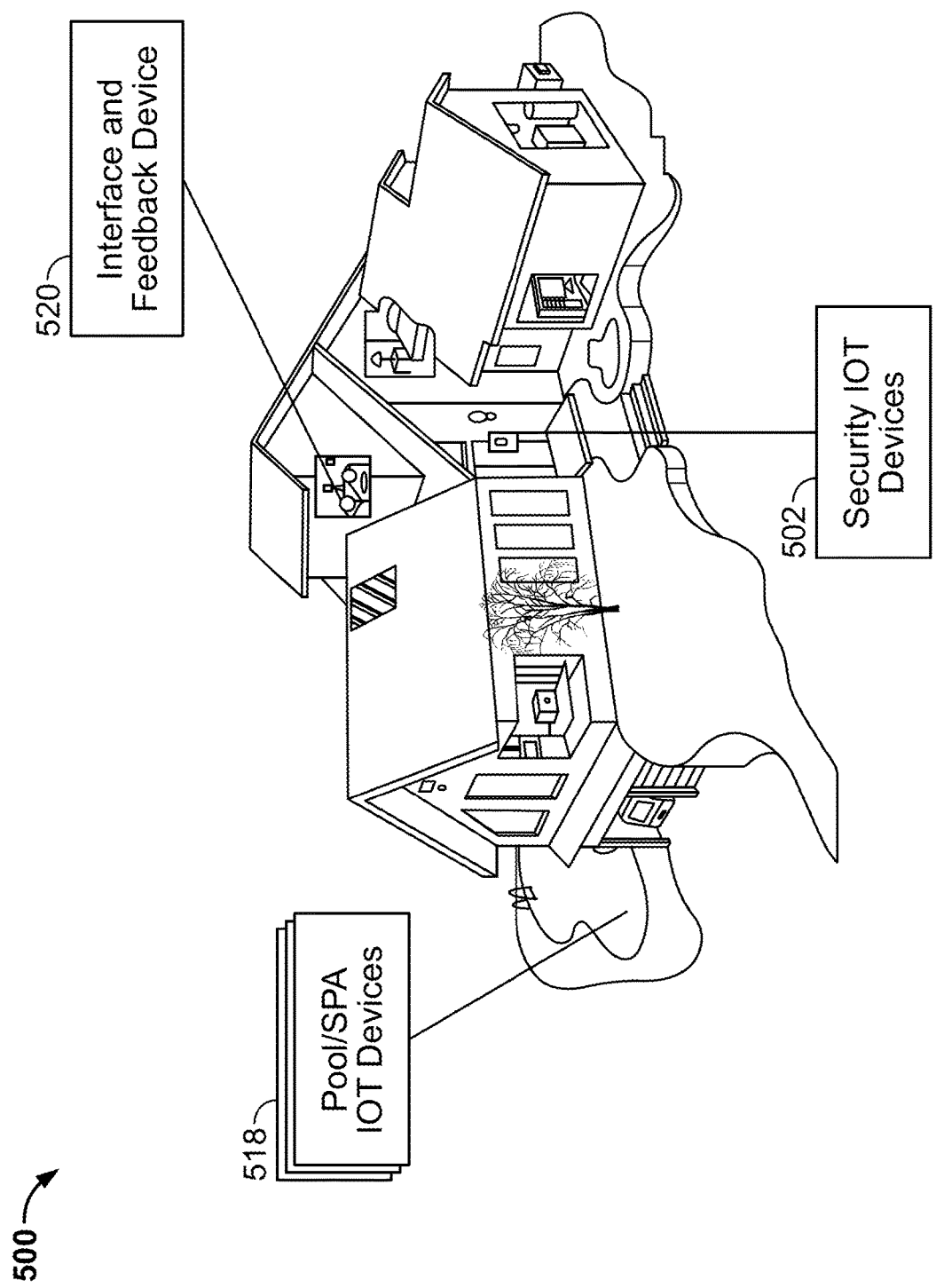
FIG. 5 is a diagram of an example deployment including embodiments of the invention, illustrating a connected residence.

FIG. 5 is a diagram 500 of an example IoT device deployment at a residence in order to create a set of connected objects around the home. The illustrated example IoT devices for connecting to certain objects are not limiting, but are demonstrative of a "smart home" concept where the status can be monitored, and/or operations controlled, for residential devices and systems that historically could only be monitored and controlled manually. Additionally, using the IoT platform described above, together with user interactions and feedback, data from different types of objects and IoT devices may be collected, aggregated, and analyzed to identify previously unknown optimizations, synergies, impacts, and cooperative functionalities between objects in the home. In the illustrated example, the IoT devices may be natively included as a component of the corresponding connected object, or may be retroactively connected (e.g., via sensors and control interfaces as described above) to an unconnected object to connect that object to the IoT platform.

Non-limiting example IoT devices in the diagram 500 include: security IoT devices 502 that monitor home activity, such as smart doorbells, indoor and outdoor video cameras, security/alarm systems, etc.; fixture IoT devices 504 for connecting to "analog" home fixtures, such as faucets and other plumbing; appliance IoT devices 506 for connecting to in-home appliances such as televisions, washers and dryers, refrigerators, dishwashers, garbage disposals, coffee makers, etc.; HVAC IoT devices 508 for connecting to air conditioning units, heating units, vents, etc.; water supply IoT devices 510 for connecting to water heaters, water softeners, water filtration systems, water and sewer pipes, sump pumps and other water pumps, etc.; interior environmental sensor devices 512 such as motion detectors, light detectors, sound detectors, smoke detectors, carbon monoxide detectors, thermostats, etc.; exterior sensor devices 514 such as light and motion detectors, rain sensors, wind sensors, etc.; irrigation IoT devices 516 for connecting to watering system control panels, valves, water lines, areas of earth/soil, etc.; and, pool and spa IoT devices 518 for connecting to pool controls, pool pumps, pool lights, the pool/spa itself, etc. Some or all of the IoT devices 502-518 may collect and send data to a gateway, router, or base station in the home, or directly to a cloud-based server; configuration and control commands may be transmitted in the opposite direction.

The deployment may further include one or more IoT platform interface/feedback devices 520, such as a resident's desktop PC or smartphone having software or a browser interface executing thereon to access the IoT platform and monitor, configure, control, add, remove, change, and perform other management operations on the IoT devices 502-518 and/or interact with collected and analyzed data. The IoT platform may further include a vehicle IoT system 530 installed in the resident's vehicle. In some embodiments, the installation may include a user interface similar to that of the feedback device 520, installed on a computer of the vehicle and presented, e.g., on a navigation screen or another display device. Additionally or alternatively, the vehicle IoT system 530 may include one or more IoT devices that monitor and/or control various properties of the vehicle, such as motor speed and temperature, fuel/battery level, interior temperature, ignition, etc.

FIG. 6 shows an illustrative system 600 that enables the monitoring, performance evaluation, and control of connected devices in a residential water system. The system 600 may include one or more network-enabled devices (e.g., which may each include or correspond to an IoT device such as the IoT device 200 of FIG. 2) including without limitation: a controller 602; smart valves (e.g., valves 613, 625, 654, 658, and 662); flow meters (e.g., meters 642, 648, 650, 656, 660, and 664); manifolds 628; pumps; filters; monitoring devices 1104 and sensors; integrated systems such as a water filtration system 614, a water softener system 652, and a sump pump system 906; water-using appliances 629; and other water system components that can be network-enabled as described herein. For example, in some embodiments the system 600 may include any network-enabled component of the water system and any of its subsystems, such as water subsystems dedicated to management of water at a residential feature (e.g., a pool/spa 1102), or within an area of the residence (e.g., a basement 902), or at a particular point in the flow of water through the water system. For example, the system 600 can include a point-of-entry (POE) system 2010 (and any integrated systems and/or components thereof) at a point-of-entry where feed water (i.e., from a municipal source, well, or other water source 612) enters the residential water system.

The system 600 may further include one or more remote servers 608, one or more user devices 644, a gateway 604 (e.g., gateway 320 of FIG. 3), which may be alternatively referred to as a base station or a router, and a network 606, which may be a LAN, WAN, or the internet. The gateway 604 may route data (e.g., including commands, messages, sensor data, profile data, alerts, or other applicable information) locally between the network-enabled devices of the system 600 that are in direct communication with the gateway 604, and globally between local devices and remote devices via the network 606. One or more user devices 644 and one or more remote servers 608 may be communicatively coupled to the gateway 604 via the network 606. The user devices 644 may include personal computers, tablets, smart phones, etc. In some embodiments, at least a portion of water-using appliances 629 in the system 600 may be network-enabled devices that are communicatively coupled to the gateway 604. The controller 602 may be in direct communication with the gateway 604 in order to access data at the gateway 604, send commands to the various network-enabled devices (or a specific one or more of the devices), exchange communications with remote servers 608 and/or user devices 644, etc. Alternatively, the controller 602 may communicate directly with some or all of the network-enabled devices.

A smart valve 613 and a flow meter 648 may be coupled between a node 649 and the output of a water source 612, which may be, for example, the main water line into a building such as a residence or business, an output of a water softener, or an output of a hot water heater. For example, the smart valve 613 can be, or can connect to, a municipal water meter with an integrated controller. The smart valve may selectively enable and disable the flow of water into the system 600. The flow meter 648 may measure the flow rate of water passing through it and may generate corresponding flow rate data. The flow meter 648 may be communicatively coupled to the gateway 604 and may thereby transmit flow rate data to the controller 602 or remote servers 608. The smart valve 613 may be communicatively coupled to the gateway 604 and may receive commands from the controller 602, which set the state (e.g., open or closed) of the smart valve 613. The node 649 may split the flow of water output from the flow meter 648 (e.g., with a pipe fitting that splits the flow of water) between an input of the water softener system 652 and an input of a manifold 628. A smart valve 662 and a flow meter 664 may be coupled between the node 649 and an input of the manifold 628, and may operate similarly to the smart valve 613 and the flow meter 648, respectively, to monitor and control the flow of input water into the manifold 628.

The system may include one or more water leak sensors 620 disposed in (an) area(s) of the building in which leaks may be likely to occur (e.g., in the kitchen, laundry room, or bathroom). The water leak sensor 620 may be, for example, a moisture sensor which, upon coming in contact with moisture, sends an alert to the controller 602 via the gateway 604 to indicate that a leak has been detected. In response to this alert, the controller 602 may cause an alert to be sent (e.g., in the form of a push notification or a text message) to one or more of the user devices 644 via the gateway 604 and the network 606. In some embodiments, in response to being alerted to the presence of a leak, the controller 602 may cause various valves to close to mitigate the leak. For example, the smart valve 613 at the inlet to the building may be closed, blocking the flow of all water into the building. In other embodiments, the alert provided by the water leak sensor 620 may indicate a particular area of the building in which the leak has occurred, and the controller 602 may instruct the manifold 628 and/or the water heater 622 to close valves at outputs coupled to appliances in the indicated area. For example, if a leak is detected in the kitchen, the controller 602 may instruct the manifold 628 and/or the water heater 622 to block their respective outputs that are coupled to a water tap 634A in the kitchen, and to the dishwasher 636. As another example, if a leak is detected in the laundry room, the controller 602 may instruct the manifold 628 and/or the water heater 622 to block their respective outputs that are coupled to the washing machine 624.

The water softener system 652 may be coupled to receive water from one of the two outputs of the node 649. The water softener system 652 may, for example, be an ion exchange system (e.g., a sodium ion exchange system) that reduces the mineral content (e.g., the calcium and magnesium content) of water passing through it to produce "softened" water. In some embodiments, the water softener system 652 may include an internal flow meter and smart valve 652A at its input and/or output, so that the flow of water through the water softener system 652 may be measured and controlled. The input valve 652A of the water softener 652 may be selectively opened and closed by the controller 602 and/or an integrated controller of the water softener 652. In this way, the flow of softened water into the building may be selectively blocked (e.g., when a leak is detected by the water leak sensor 620 or any other applicable leak detection mechanism). The controller 602 may communicate with the water softener 652 or a processor thereof to control the amount of water softening agent (e.g., salt) that the water softener applies to the water it receives from the flow meter 648.

In some embodiments, one or more measures of efficiency of the water softener system 652 may be determined by comparing the input flow rate of the water softener system 652 to the output flow rate of the water softener system 652 or by comparing the total amount of water input to the water softener system to the total amount of water output by the water softener system. However, in some embodiments, the flow rate at the input of the water softener may be calculated (e.g., by a processor of the controller 602) as a difference between the flow rate measured by the flow meter 648 and the flow rate measured by the flow meter 664. Somewhat similarly, the flow rate at the output of the water softener may be calculated as a sum of the flow rate measured by the flow meter 656 and the flow rate measured by the flow meter 660. The output of the water softener system 652 may be coupled to a node 653, which may split the flow of softened water output by the water softener system 652 between an input of the water filtration system 614 and an input of the manifold 628. A smart valve 654 and a flow meter 656 may be coupled between the node 653 and the input of the water filtration system 614, and may operate similarly to the smart valve 613 and the flow meter 648, respectively, to monitor and control the flow of softened water into the filtration system 614. A smart valve 658 and a flow meter 660 may be coupled between the node 653 and an input of the manifold 628, and may operate similarly to the smart valve 613 and the flow meter 648, respectively, to monitor and control the flow of softened water into the manifold 628.

In an alternate embodiment, the smart valve 613 may be omitted and the output of the flow meter 648 may be coupled only to the water softener 652, such that the water softener 652 is the only source of water provided to the manifold 628. In this alternate embodiment, the flow of water into the building may be shut off by closing an input valve 652A of the water softener 652 in response to the detection of a leak. For example, the water leak sensor 620 may send an alert to an on-board controller of the water softener 652 through the gateway 604 indicating that a leak has been detected and, in response, the on-board controller may instruct the input valve 652A to close.

The water filtration system 614 includes water-filtering components working in concert to receive softened or unsoftened water and produce filtered water for drinking and other applications. In some embodiments, the water filtration system 614 uses a combination of reverse osmosis (RO) water filtration and activated carbon water filtration. However, it should be understood that other types of water filtration may be used in combination with or instead of these filtration methods. In such alternate embodiments, the water filtration system 614 may perform ionization, ultraviolet filtration, or infrared filtration. Non-limiting example water-filtering components include a pre-filter, controllable relays (i.e., pipes between different components, having controllable valves), a carbon filter, a membrane, a post filter, and a storage tank. Other embodiments of a water filtration system 614 may include additional or substitute components; for example, controllable relays are typically interconnecting pipes with valves, but may instead be fluid connectors, or a fluid manifold system, or a piston and valve system. An input of the water filtration system 614 (e.g., into the pre-filter; into the relays) may receive water from an output of the flow meter 656. While shown here to be external to the water filtration system 614, in alternate embodiments the smart valve 654 and/or the flow meter 656 may be internal components of the water filtration system 614.

In some embodiments, the water filtration system 614 may include an integrated or otherwise dedicated controller 603, and one or more of the water filtration system 614 components (including the smart valve 654 and/or the flow meter 656, in some embodiments) may be an IoT-enabled or otherwise connected device that communicates with and may be controlled by the controller 603. For example, some or all of the pre-filter, the carbon filter, the membrane, the post-filter, and other water-filtering components may include on-board diagnostic systems or may be coupled to a diagnostic system of the water filtration system 614; the controller 603 may include (or a processor thereof may implement) a diagnostic module, which may function as such a diagnostic system. The diagnostic system may periodically perform diagnostic checks to determine the status (sometimes referred to herein as the "filter status") of these components of the water filtration system 614. The determined status may include filter information such as the last time a given filter was changed, whether the given filter has been changed since the last time a diagnostic check was performed, whether a mechanical failure has occurred in the given filter, such as plugging (e.g., indicating that the filter has reached the end of its useful life), black water (e.g., where activated carbon from the filter cartridge enters the water stream), or leaks (e.g., which may be identified as water pressure drops across the filtration system 614). The controller 603 may be an IoT device (e.g., IoT device 200 of FIG. 2) communicatively coupled to the gateway 604, and may control the operation of the relays, thereby controlling the flow of fluids through the water filtration system 614.

A portion of the input water, referred to herein as permeate or filtered water, may pass through the filtration system 614 for distribution, leaving behind most (e.g., 95%-99%) of the solids originally contained within the input water (e.g., salt or other minerals) referred to herein as concentrate. The concentrate may be routed to a drain 640 via a concentrate outlet of the membrane. The permeate may be passed to an input of a manifold 628 for subsequent use in various water appliances 629; a portion of the permeate may be stored in a storage tank for future on-demand use.

A smart valve 625 may be coupled between the water filtration system 614 and the manifold 628 so that the flow of water into the manifold 628 from the water filtration system 614 may be selectively enabled and disabled. In some embodiments, a flow meter 650 may be coupled between the smart valve 625 and the manifold 628 and may measure the flow rate of water passing between the two components. The flow meter 650 may be communicatively coupled to the gateway 604 and may thereby transmit flow rate data to the controller 602 or remote servers 608. The smart valve 625 may be communicatively coupled to the gateway 604 and may receive commands from the controller 602, which set the state (e.g., open or closed) of the smart valve 625. These commands may be automatically generated or may be generated in response to user input provided to the controller 602 from the user devices 644 via the network 606 and the gateway 604. While shown here to be external to the water filtration system 614, in alternate embodiments the smart valve 625 may be an internal component of the water filtration system 614 and may be controlled by the controller 603.

A manifold 628 may be a network-enabled smart manifold, having controllable valves at each of its inputs and outputs so that the flow of water through the manifold 628 may be selectively controlled. For example, any selected output of the manifold 628 may be supplied with a selected water type—unsoftened and unfiltered output from the flow meter 664, softened and unfiltered output from the flow meter 660, or softened and filtered output from the flow meter 650. In other embodiments, the system 600 may include multiple manifolds 628, each connecting certain types of water to certain endpoints. For example, the POE system 2010 may include a discrete manifold 628 for distributing each of the input water, the softened water, and the filtered water; additionally or alternatively, the POE system 2010 may include a first manifold 628 connecting to the water appliances 629, and a second manifold 628 connecting to the first manifold 628, a water heater, and a fill valve 1114 of the pool/spa. A network-enabled controller (e.g., IoT device 200 of FIG. 2) may be included in or coupled to the manifold 628, enabling remote and automatic control of the manifold 628 via a wired or wireless connection to the base station/gateway/router 604. In some embodiments, when the system 600 includes multiple manifolds 628, each manifold 628 may be its own separately-addressable device, having a dedicated controller communicating with the gateway 604 or with a routing-capable controller maintaining its own network address table (NAT) for the manifolds 628.

The water appliances 629 may, for example, include a steam oven 630, a beverage device 632, one or more water taps 634A, B, . . . , N (i.e., leading to the N faucets in the residence) and/or separate drinking water taps 2022, a dishwasher 636 and/or other applicable appliances, such as a washing machine 624. Network-enabled flow meters 642 may be interposed between the manifold 628 and the water appliances 629. Each of the flow meters 642 may include or may be coupled to a network-enabled controller (e.g., IoT device 200 of FIG. 2) by which the flow meters 642 may be communicatively coupled to the gateway 604. The flow meters 642 may monitor the flow rates of water passing between each of the outputs of the manifold 628 and the water appliances 629, and may communicate corresponding flow rate data to the controller 602 through the gateway 604. Each sampling of flow rate data from the flow meters 642, 648, 650, 656, 660, and 664 may be referred to herein as a "data capture" or "flow rate data capture". From this flow rate data, the controller 602 may identify potential leaks or misuse of filtered water, and may assess the total water consumption and/or the consumption of softened or filtered water as compared to other equivalent homes or businesses in the same area, as will be explained below.

Another prevalent concern among home and business owners is the prevention of flooding in rooms located below ground and, in particular, those located near or overlapping the water table. Such rooms often require a sump pump to route water that has collected in the room out of the building. Thus, the system 600 may include subsystems and components through which water accumulation (e.g., flooding) in a basement 1902 may be detected and appropriate mitigating action taken. The system 600 may include devices and systems located in the basement 1902, such as a dehumidifier 1904, a sump pump system 1906, a moisture sensor 1907, and a humidity sensor 1910. The sump pump system 1906 may be a submersible sump pump system that includes a water level sensor 1908 (e.g., a float sensor) and a pump 1909. Each of the dehumidifier 1904, the moisture sensor 1907, the water level sensor 1908, the sump pump 1909 and the humidity sensor 1910 may include or be coupled to a network-enabled controller (e.g., IoT device 200 of FIG. 2) that enables communication between these devices and the gateway 604.

The controller 602 may be implemented as a network-enabled device in the home, or may be implemented as part of a cloud-based architecture. For example, in a cloud-based implementation of the controller 602, the functions of the controller 602 may be performed by a dedicated module running on the remote servers 608, which may eliminate the need for a physical controller to be installed in the home or business of the user. In one embodiment, the controller 602 may be a central control hub, which may include a processor, volatile and non-volatile memory, a user interface, and network interface circuitry. While the example system shows the controller 602 communicating with the network-enabled components through the router 604, in some embodiments the controller 60 can communicate directly with the water system components via WiFi, Bluetooth, a mesh network, or another suitable communication network or a combination thereof. In some embodiments, the system 600 can include one or more sub-controllers that communicate with some or all of the network-enabled components of a particular subsystem, either as the exclusive controller (thus serving as an intermediary between the corresponding components and the controller 602) or in conjunction with the controller 602. For example, a pool sub-controller 605 can receive commands for connected pool components (e.g., pump, filters, heater, etc.) and distribute accordingly and can receive device and sensor data from the components (e.g., monitoring devices 1104) and report the data to the controller 602 and/or the remote servers 608 and/or user devices 644. In some embodiments a sub-controller can be a network router, providing a LAN to the components of the associated subsystem. The controller 602 or the remote servers 608 may communicate with the controllers of network-enabled components (and/or intermediating sub-controllers) automatically or in response to manual user commands (e.g., provided at the user interface of the controller 602 or by one of the user devices 644).

Additionally, in some installation sites the various network-enabled components of the water system can be so physically distant from a base station/router 604 that reliable communications between them cannot be established. In some embodiments, the system 600 can include one or more relays 607 extending the range of the router's 604 wireless network so that the distant devices can connect. A relay 607 can be any suitable wired or wireless network repeater/booster, and can be wired or wirelessly connected to the router 604. The relay 607 can also be wired or wirelessly connected to the network-enabled components, in various embodiments. The relay 607 can communicate with the router 604 over an encrypted communication channel, in some embodiments using a proprietary protocol.

Figure 6A:
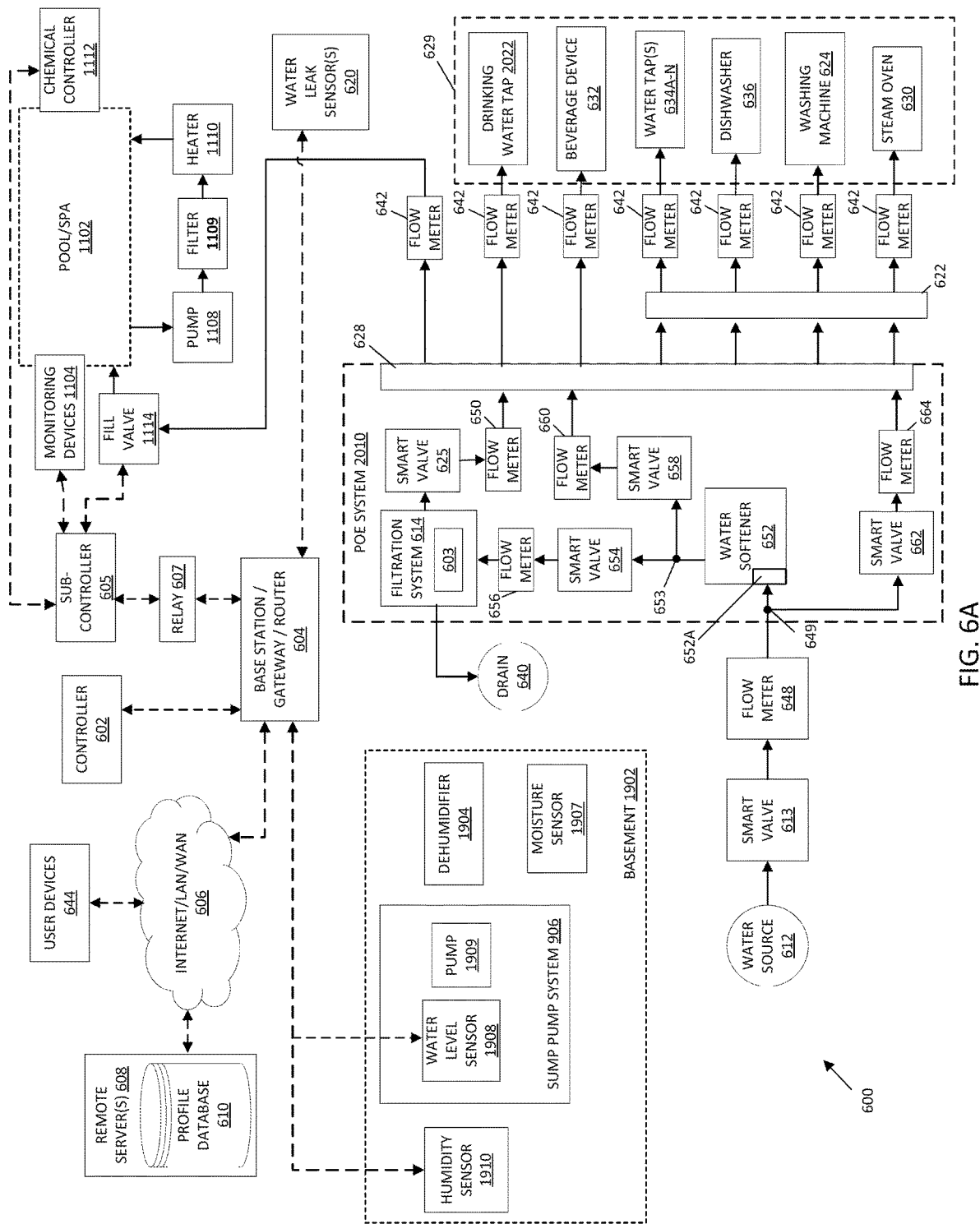
FIG. 6A is a block diagram of an example embodiment of a communication system for water systems including a water point-of-entry system, a water softener system, a water filtration system, water-using appliances, a pool/spa system, and a subterranean water removal system.
Figure 6B:
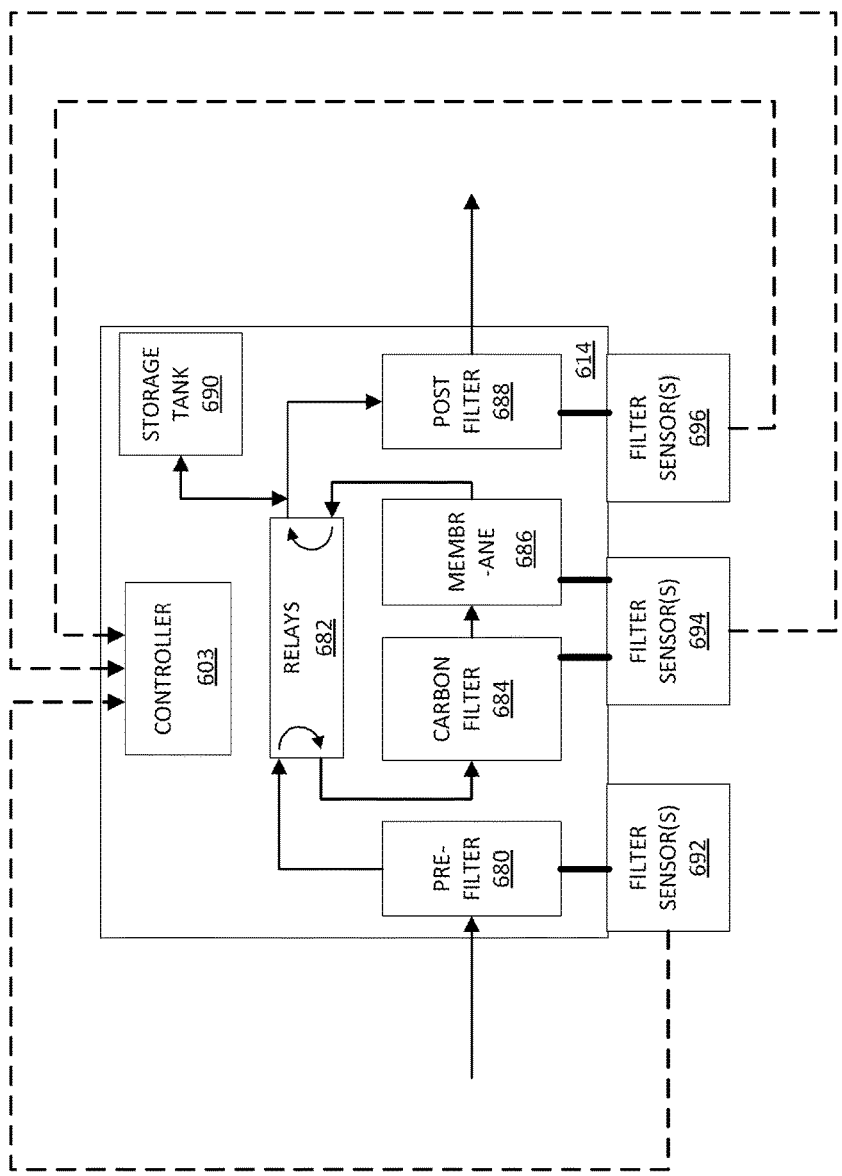
FIG. 6B is a block diagram of the water filtration system of FIG. 6A.

FIG. 6B illustrates an example implementation of the filtration system 614 of FIG. 6A. In some embodiments, the water filtration system 614 may include a controller 603, a pre-filter 680, controllable relays 682 (i.e., pipes between different components, having controllable valves as described herein), a carbon filter 684, a membrane 686, a post filter 688, and a storage tank 690. Other embodiments of a water filtration system 614 may include additional or substitute components; for example, controllable relays 682 may instead be fluid connectors, or a fluid manifold system, or a piston and valve system. An input of the water filtration system 614 (e.g., an input of the pre-filter 680) may receive a stream of input water. The pre-filter 680 may be a sediment pre-filter, for example. An output of the pre-filter 680 may be coupled to and in fluid communication with an input of the relays 682. In other embodiments, the pre-filter may be omitted and the input water source may be coupled directly to the input of the relays 682. An output of the relays 682 may be coupled to and in fluid communication with an input of the carbon filter 684, such that water received by the relays 682 from the pre-filter 680 may be controllably passed to the input of the carbon filter 684. An output of the carbon filter 684 may be coupled to and in fluid communication with an input of the membrane 686, which may be a semi-permeable membrane. In some embodiments, a pump (not shown) may apply pressure to water being fed into the input of the membrane 686. In some embodiments, pre-filter 680 and/or post-filter 688 may be optionally omitted in order to increase the driving pressure across the membrane 686. The post filter 688 may be a sediment post filter, for example.

The membrane 686 produces permeate and concentrate. The concentrate may be routed to a drain line via a concentrate outlet of the membrane 686. Permeate may be passed to an input of the relays 682 via a permeate outlet of the membrane 686 coupled thereto. The permeate may then be controllably passed from an output of the relays 682 to an input of the post filter 688 for subsequent use in various water appliances, or may be routed to the storage tank 690 to be stored for future use. In this way a supply of filtered water (e.g., permeate) may be collected for on-demand use. The storage tank 690 may include a water level sensor that detects when the storage tank 690 is full. In response, the water level sensor may send data to the controller 603 indicating that the storage tank 690 is full. The controller 603 may then control the relays 682 to stop the flow of water through the water filtration system 614 until the water level sensor detects that the storage tank 690 is no longer full. Alternatively, the controller 603 may send data to the controller 602 indicating that the storage tank 690 is full and, in response, the controller 602 may close the smart valve 613 in order to block the flow of water into the water filtration system 614.

Some or all of the pre-filter 680, the carbon filter 684, the membrane 686, and the post-filter 688 may include on-board diagnostic systems or may be coupled to a diagnostic system of the water filtration system 614. For example, the controller 603 may include (or a processor thereof may implement) a diagnostic module, which may function as such a diagnostic system. The controller 603 may communicate electronically with one or more filter sensors via wired or wireless connection. Any number of filter sensors can monitor and/or measure the values of specific properties associated with one or more of the components of the filtration system 614. Non-limiting examples of such filter sensors include: one or more filter sensors 692 disposed to measure properties of the pre-filter 680; one or more filter sensors 696 disposed to measure properties of the post-filter 688; and, one or more filter sensors 694 disposed to measure properties of one or both of the carbon filter 684 and the membrane 686, and/or properties occurring between the carbon filter 684 and the membrane 686. A filter sensor can be a general filter monitoring device that is integrated into or connected to the corresponding filter, and that monitors and/or measures multiple properties associated with filter performance, such as water quality, flow rate, and volume on either side of the filter, as well as power consumption, operating time, and remaining life. In some embodiments, a filter sensor can be a pressure transducer or another type of pressure sensor disposed to monitor fluid pressure on the filter or inside the filter housing. The diagnostic system may periodically perform diagnostic checks to determine the status (sometimes referred to herein as the "filter status") of these components of the water filtration system 614. The determined status may include filter information such as the last time a given filter was changed, whether the given filter has been changed since the last time a diagnostic check was performed, whether a mechanical failure has occurred in the given filter, such as plugging (e.g., indicating that the filter has reached the end of its useful life), black water (e.g., where activated carbon from the filter cartridge enters the water stream), or leaks (e.g., which may be identified as water pressure drops across the filtration system 614).

Figure 7:
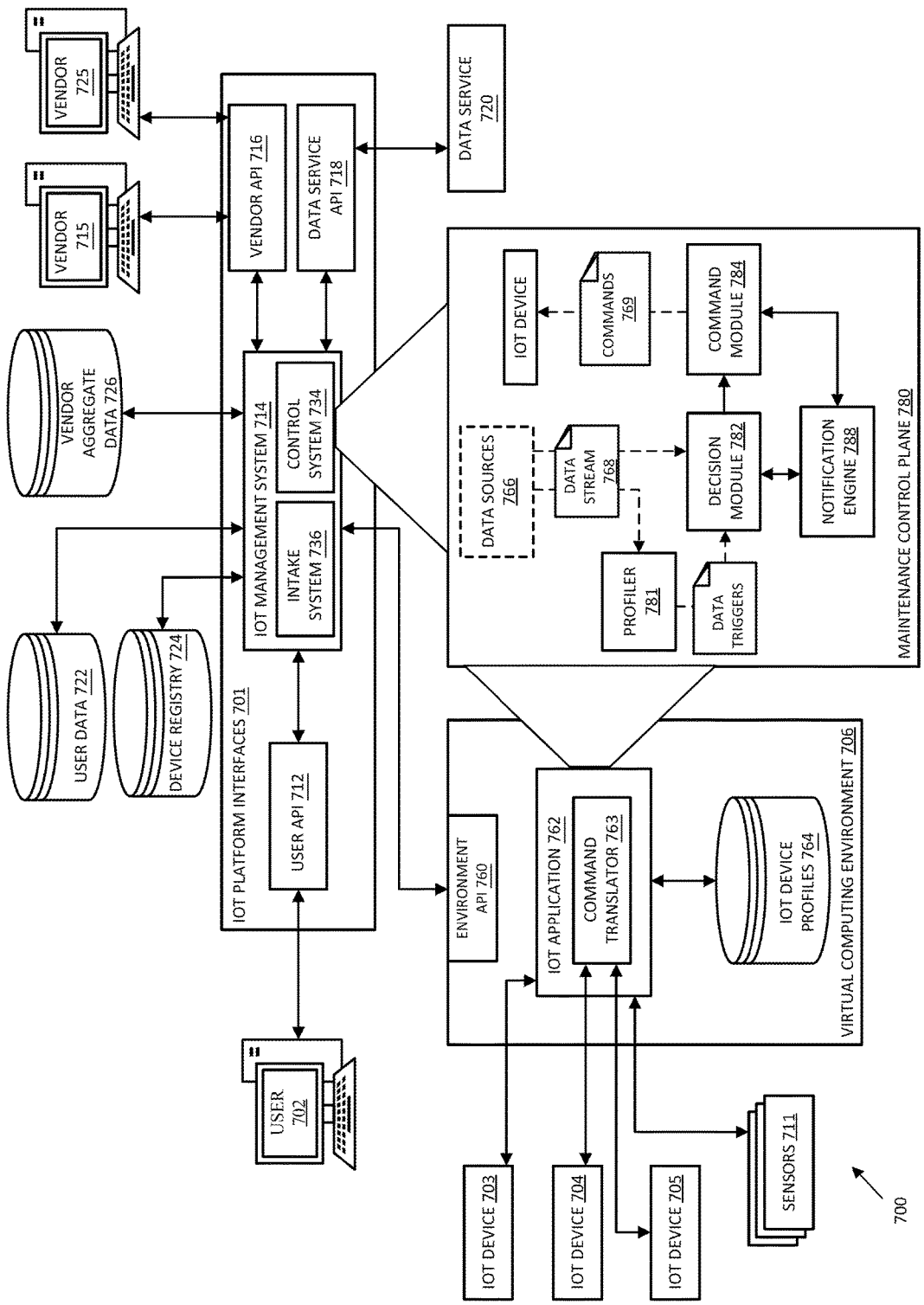
FIG. 7 is a block diagram of an example embodiment of yet another computing environment in accordance with some embodiments of the invention.

FIG. 7 illustrates an example system 700 that, like the system 400 of FIG. 4, implements a computing environment for various users to, via communications with an IoT management system 714, connect one or more IoT devices 703, 704, 705 to an IoT application 762 executing in a virtual computing environment 706. FIG. 7 illustrates an example system in which an IoT application 762 (as described above with respect to FIG. 4) or a control system 734 of the IoT management system 714, alone or in cooperation with each other, implement a maintenance control plane 780. The IoT devices 703, 704, 705 connected to the IoT management system 714 via the IoT application 762 may each be connected to a different component of a water subsystem, and may belong to the same or different subsystems of the water system, as described above. For example, a first IoT device 703 may be a temperature sensor submerged in the swimming pool, and a second IoT device 704 may be integrated into or connect to a pool pump for the pool; the control plane 780 may include the two IoT devices 703, 704, among others, in a subsystem for the swimming pool. In some embodiments, the control plane 780 may include groupings of the IoT devices 703-705 into one or more groups according to the subsystem(s) to which they belong, for the purposes of collecting and/or aggregating data and/or issuing commands.

An IoT device may generate data according to its normal operations, and some or all of the data may be received by the IoT application 762 and stored (e.g., in an IoT device data store 764), aggregated, transformed, or discarded. In some embodiments, the IoT device data for many water systems (e.g., all water systems including IoT-enabled water devices made by a particular manufacturer) can be aggregated, processed, and stored in one or more secure data stores 726. Additionally, the control system 734 can obtain data generated or collected outside of the water system and its connected devices; in some embodiments, the control system 734 can connect to an external data service 720, using an API 718 for the data service 720, to collect the externally generated data. For example, the control system 734 can connect to a weather data service to obtain the current air temperature and humidity, and the rain forecast and/or historical rain data, for the water system's geographical location. In the control plane 780, some or all of this data from the various data sources 766 (i.e., live data from IoT devices 703-705, previously stored aggregate data, and external data) may be aggregated, compiled, reduced, and otherwise processed to produce a data stream 768 that is received by one or both of a profiler 781 and a decision module 782. The profile can analyze data in the data stream 768 to generate and update device health profiles that describe normal and abnormal operational characteristics of the corresponding water devices, as described in detail below. The profiler 781 can also generate data triggers that the decision module 782 can use to determine whether a problem or a certain condition is detected in a water device or subsystem. A data trigger may be a threshold for a certain reported status parameter, a certain type of event message received, etc. For example, a data trigger may be a threshold solids content detected in a water filter; in another example, a data trigger may be an event message indicating a component has been activated or deactivated.

The decision module 782 can communicate with a command module 784 configured to communicate with one or more of the IoT devices. When a data trigger is met (i.e., triggered) by data identified in the data stream 768, the decision module 782 determines an action to be taken, based at least on the data trigger met, and sends information about the action to the command module 784. The information may identify the command(s) 769 to be issued and the IoT device(s) 705 to receive the command(s) 769; or, the information may be processed by the command module 784 to determine the command(s) 769 to issue to the IoT device(s) 705 or subsystem(s). The command module 784 can send the command(s) 769 to the IoT device(s) 705, which may execute the command(s) 769 in an attempt to remediate or otherwise address the problem/condition identified in the subsystem 766. In some embodiments, a command 769 may change the operational parameters of a component or subsystem outside of the subsystem 766 (e.g., IoT device 705).

The control plane 780 may further include a notification engine 788 that can evaluate output of the decision module 782 and/or command module 784 to determine (e.g., based on user settings) whether and when to report collected data to the user. The notification engine 788 can further evaluate user input (e.g., via the user API 712 in response to a notification) to determine the command(s) 769 to issue to a particular water device. For example, the decision module 782 may notify the notification engine 788, before notifying the command module 784, that a data trigger has been met; the notification engine 788 may generate a notification to the user, receiving user input in response, and this user input may be delivered to the decision module 782 (e.g., indicating that no action should be taken) and/or to the command module 784 (e.g., identifying the command(s) 769 to execute). The notification engine 788 can be configured by user-provided settings to generate and "push" notifications to an identified user device (e.g., device 702, or a "smart home assistant" hub such as an Amazon Echo or Google Home Assistant device). Using the settings the user can activate and deactivate the notifications the user receives; for example, the user can activate notifications related to particular water devices on a device-by-device basis. The user can also set parameters by which notifications are generated, such as by providing desired set points for parameters such as spa temperature; the notification engine 788 processes the settings to determine that a notification should only be sent when the set point is breached.

In various implementations, a home or business network of IoT devices 703-705 may include IoT devices 704, 705 from various manufacturers, using various (sometimes proprietary) formats and protocols for their communications. It would be advantageous for an IoT platform to enable a vendor (i.e., manufacturer, sales associate) of a "non-native" IoT device to add such device to the platform and configure the device to communicate with other devices in the network. The system 700 may provide IoT platform interfaces 701 including: a user API 712 that can be accessed by user devices 702 to exchange data with the IoT management system 714; and, a vendor API 716 that can be accessed by devices 715, 725 of various IoT device vendors to describe their IoT devices to the platform in a way that enables the platform to facilitate communications between the vendor IoT devices and other IoT devices on the platform. An intake system 736 can ensure that the proper information for translating between native platform operations and device-specific operations is provided via the vendor API 716; furthermore, the intake system 736 may obtain (via the API 716) parameters for execution functions of the vendor device that do not have an analogue in the slate of native platform operations. Additionally or alternatively to receiving the vendor device information via the API 716, the intake system 736 can obtain the information from other sources, such as internet databases, the device itself (e.g., via a firmware communication), or agents of the IoT platform.

The vendor device information may be formatted and then added to a device registry 724, such as a database or lookup table. Device registry 724 entries may be stored in a consistent format that enables a user (e.g., via the API 712) to select the proper device when adding the IoT device 704 to the device network. The device selection is passed, along with information for interpreting device-specific commands and status parameters, to the IoT application 762. Command translations between the native command format and the device-specific format may be performed by a command translator 763 of the IoT application 762.

Figure 8:
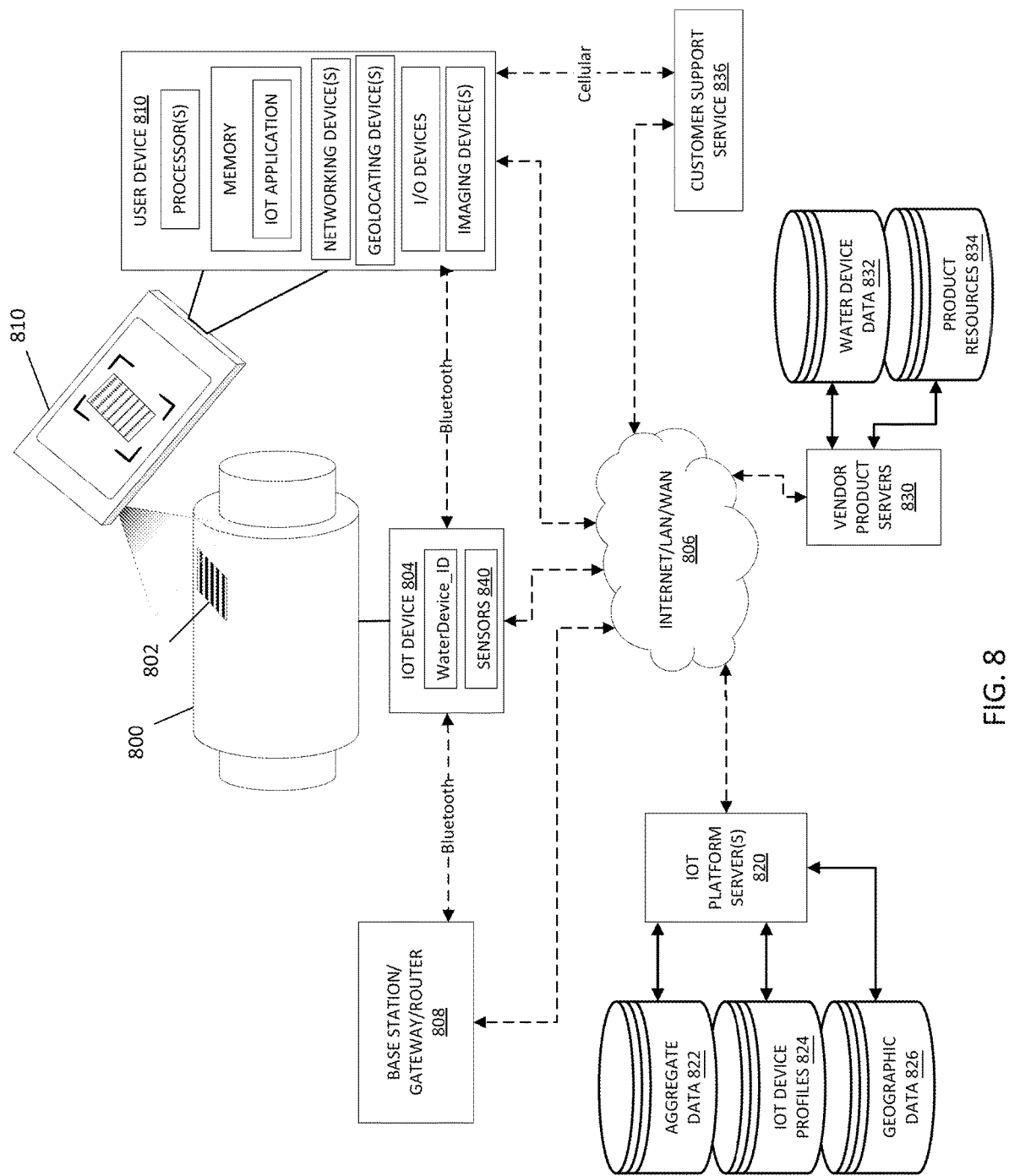
FIG. 8 is a diagram of a physical environment and a computing environment interfacing to automatically connect a network-enabled water device to an IoT platform.

Referring to FIG. 8, a connected water device 800 can be added to an IoT platform at substantially the same time that the water device 800 is installed in a water system. Moreover, certain functions of the predictive and preventative maintenance system implemented on the IoT platform as described herein can be enabled by providing the water device 800 with an electronically readable unique identifier that is known to the water device 800 manufacturer, retailer, and/or installation and servicing company. In some embodiments, the identifier can be embodied in a physical marker 802, such as a badge, single- or multidimensional barcode, or serial number engraved or imprinted on the water device 800 itself, or alternatively on its packaging or enclosed guides/manuals. Additionally or alternatively, the electronic embodiment of the identifier may be stored in non-volatile memory or in another integrated circuit within the IoT device 804 or controller packaged with the water device 800. Alternatively, such as when the IoT device 804 is sold separately from the water device 800 and is paired to the water device 800 at installation, the electronic identifier can be delivered to the IoT device 804 at installation.

In some embodiments, an installer of the water device 800 can use a personal user device 810 to facilitate the installation processes (see below). The installer can be the end user/new owner of the water device 800 or a serviceperson contracted to install the device 800 in the end user's water system. The user device 810 can be any consumer-grade smartphone, tablet computer, or other mobile device, which is equipped with at least one camera and memory storing software for controlling the camera to capture images, which are also stored in memory. In one embodiment, the user device 810 can have a version of the IoT application installed and executing thereon during the installation process. The IoT application may be an installer's version, which can direct the installer to capture an image of the marker 802 that can be processed to determine the device identifier encoded therein. The IoT application may be able to determine the identifier from the image, or may send the image (e.g., via a communication network 806) to the IoT platform servers 820 and/or vendor product servers 830, receiving the identifier in return. The user device 810 or the decoding server(s) 820, 830 can further send the device identifier to the IoT device 804. The IoT device 804 can store the identifier; further, if the IoT device 804 has already stored the identifier, the IoT device 804 can check the newly received identifier to confirm it matches.

The user device 810 and/or the IoT device 804 may communicate with various other components of the computing environment in order to complete the installation process. For example, the router 808 at the installation site can allow the IoT device 804 to connect to the internet, and can provide the public IP address that the IoT platform servers 820 use to identify relevant geographic data 826. Other IoT platform data, such as the aggregate data 822 and IoT device profiles 824 described above, and data reported by the sensors 840 of the IoT device 804 once a connection is established, can be used to register and configure the water device 800. Similarly, the vendor's product servers 830 can provide access to catalog data and other water device data 832 for configuring the water device 800, and the product resources 834 such as installation guides and user manuals can be sent to the user device 810 and/or to a customer support service 836 to aid in installation.

Figure 9A:
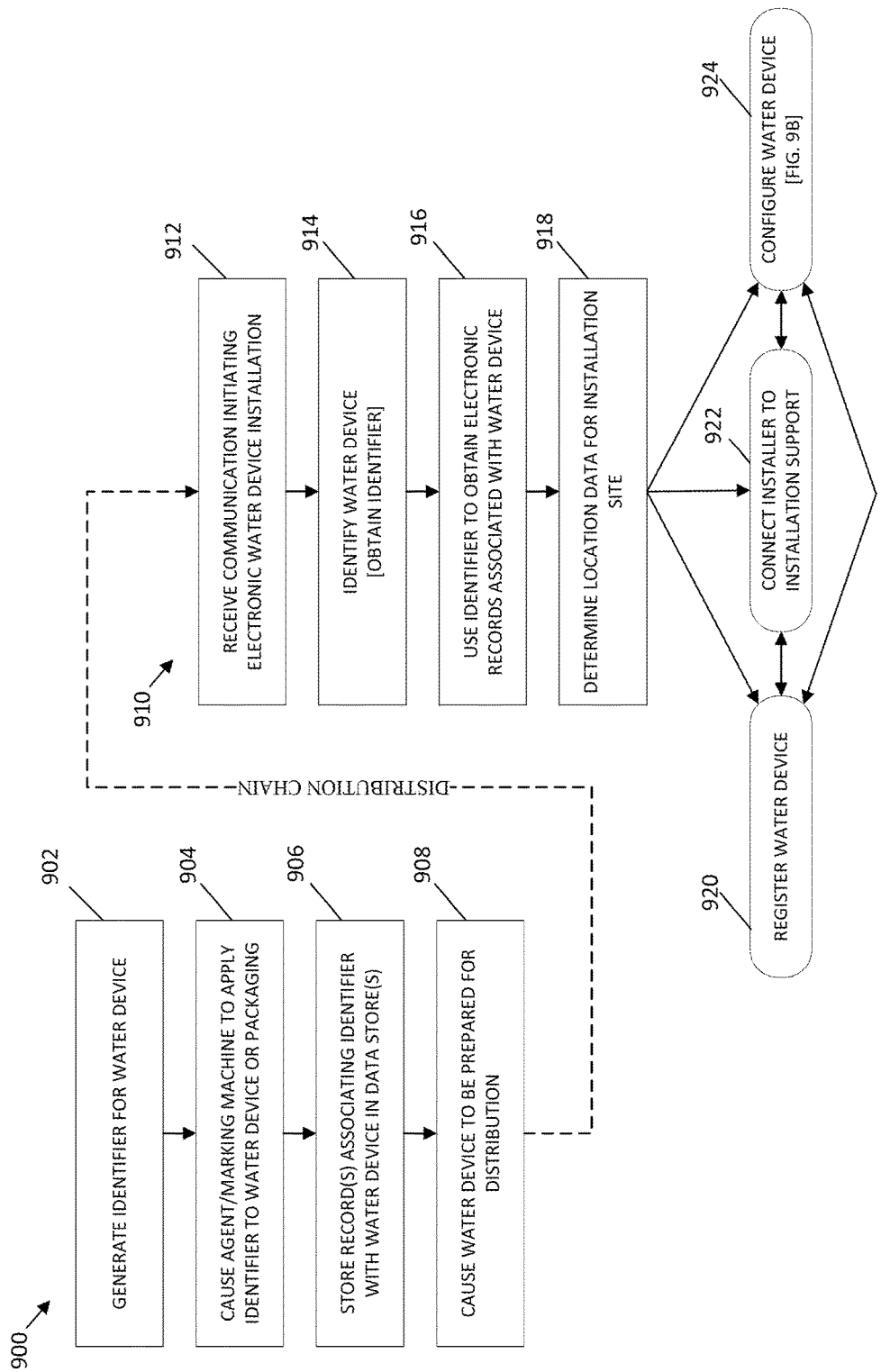
FIG. 9A-B are flowcharts of example methods of manufacturing, distributing, and installing a network-enabled water device that connects to an IoT platform.

FIG. 9A provides example methods 900, 910 by which a water device (e.g., water device 800 of FIG. 8), particularly one that is connectable to one or more communication networks (e.g., via an IoT device 804 as shown in FIG. 8), can be identified and configured through partially or entirely automated electronic means. At 902 a computing system of the manufacturer or vendor of the water device generates a unique, electronically readable identifier (as described above), and at 904 causes the identifier to be applied to the water device at the time of manufacture, or otherwise before the water device is deployed to the installation site. For example, the system can generate a serial number or barcode and, in an interface with a user or a product marking machine, can deliver the identifier and then receive confirmation that the identifier has been imprinted on the device or its packaging. Similarly, the system can generate an exclusively electronic identifier and cause it to be loaded into the water device's onboard controller/IoT device memory. At 906, the system associates the identifier with the water device in an electronic data store. For example, the manufacturer of water devices can maintain one or more databases for tracking sold products and/or for providing resources associated with sold products, as described further herein; the system can create one or more records in such databases to include the identifier and information describing properties of the associated water device. At first, the information in the records may include only the information available to the manufacturer or vendor, such as general product information like a product type, category, make and model, family, or product line, a version of initially installed firmware, an initial configuration, etc.; the records may include data structures for storing information associated with the sale and/or distribution of the water device, which information may be added to the records when it becomes available, as described below. At 908, the system can cause the water device to be prepared for distribution. For example, the system can prompt the manufacturer to enable RFID or Bluetooth functionality of the water device and then package the water device for shipping to a distributor or customer.

Throughout the distribution chain, various entities may generate data associated with the water device and transmit the data to the system, which can store the data in the associated records. For example, the system can receive shipping information at various points in the supply chain, and add the shipping information to the appropriate record(s). In another example, the system can receive and store data from a retailer that first indicates the product has been received, then that the product has been made available for sale (e.g., placed on a shelf or listed in inventory available in an online store), and finally that the product has been sold. The retailer or an installation service can send data to the manufacturer identifying a scheduled time and location (e.g., street address) for the installation of the sold water device, and the system can store this data in the appropriate record(s). In some embodiments though, the distribution of the water device may be less precisely tracked. For example, the system may receive data indicating that units of a product have been sold by the vendor in possession of the water device, but the specific identifier of the water device may not be provided.

Tracking of the water device can be reestablished, or maintained, through the installation process. An installer, which may be the end user/new owner of the water device or a serviceperson contracted to install the device, may remove the water device from its packaging, and before, during, or after physically and/or electrically connecting the water device to other components of the water system at the installation site, the installer can initiate the electronic steps of the installation. Thus, at 912 a system, which may be the system implementing the IoT platform and/or the manufacturer/vendor computing system; receives a communication indicating that the water device is being installed. In some embodiments, this initial communication may be from the water device itself. For example, the water device may have an onboard controller or an associated IoT device that is configured to register itself with the manufacturer/vendor once an internet connection is established; the installer can connect the controller to power and to a communication network, and the controller can generate the communication and send it to the system. In another embodiment, the communication can be from another connected component that is already installed in the water system onsite. For example, the installer can connect the water device to a master controller or hub, by electrically wiring the water device to the master controller, by programming information about the water device into the master controller, by connecting the water device's controller to the master controller via an isolated local network, or any combination of these; the master controller can be programmed to send the communication. In other embodiments, the installer can use a smartphone or other personal computing device to send the communication. For example, as described above, the installer's mobile device can have an installer's version of the IoT application installed thereon; the application can, automatically when launched or in response to a user input (e.g., a tap on a displayed "start installation" button), establish a connection to the servers of the system.

At 914, the system identifies the specific water device being installed via its unique identifier. In some embodiments, the system can receive the identifier from one of the devices at the installation site. For example, the water device controller can be programmed to include the identifier in the initial communication it sends; or, the installer can read the identifier from the water device or its packaging and type the identifier into the mobile device interface, the IoT application receiving the identifier and including it in the initial communication or a subsequent communication. Alternatively, the installer can direct the IoT application/mobile device to capture or scan a marker on the water device or its packaging and convert the image or scan of the marker into the identifier; or, the IoT application/mobile device can send the image or scan or a code derived therefrom to the system, and the system can match the received data to the identifier.

At 916, the system can use the identifier to obtain the stored electronic records associated with the water device from the various data stores. At 918, the system can determine location data describing the geographic location of the installation site. The geographic location may be identified at a desired granularity, and the steps to obtain the location data may depend on the desired granularity. For example, the system may store any or all of the city/state, zip code, street address, lat/long coordinates, vendor-defined geographic region, elevation, and other geographic information, which may be obtained from disparate sources. In some embodiments, the water device is connected to the internet and has an IP address; the system may communicate with the water device, a WAN router of the water system, an internet service provider, etc., to obtain the closest public IP address to the water device (usually the water system WAN router's WAN IP address but can be the water device's own IP). The system can then, using an API to an IP location service, determine location data such as the zipcode, general area, and/or lat/long coordinates identified by the public IP address. In another example, the system may obtain the street address from purchase data or installation appointment data stored in the records obtained at 916. In still another example, when the installer is at the installation site, the IoT application on the installer's mobile device may access the mobile device's geolocation device, such as a GPS module, and obtain and send location data such as the lat/long coordinates of the mobile phone to the system.

The system can perform several more processes to provide electronic support and automation of the water device installation. These processes can be performed in coordination with the IoT platform components and the manufacturer/vendor/installer systems, in any order or concurrently, provided the required data, computing resources, and communication channels for performing a given step are available. Without limitation, these processes can include: at 920, registering the water device in the system data store(s); at 922, connecting the installer to installation support resources; and at 924, setting a valid configuration for the water device.

At 920, the system can perform additional registration processes for registering the water device with the IoT platform and or the manufacturer/vendor as a component of the end-user customer's water system. In some embodiments, the system can communicate, via the IoT application, a web console/dashboard, or another user interface, with the installer's and/or the customer's user device(s) to obtain contact and/or identifying information of the customer. Additionally or alternatively, the system can communicate with the IoT platform or various components thereof to determine whether other water devices are registered to the same customer, to the location, or to the water system at the location; if so, the system can obtain records associated with those other water devices and extract any customer information from the records. The system can then register the association of the customer with the water device in various databases, including without limitation: adding the water device to a general registry as described above, along with installation information such as installation date, installation site location, and associated user account(s); adding the water device to the records describing the IoT water system of the customer, in the user data store; adding the customer data to the manufacturer/vendor device data store to identify the customer as an owner of a device having the device type; and, adding installation data (particularly if installation is complete, when the installation data can include the device configuration as described below) to the manufacturer/vendor device data store to enable maintenance tracking and support services, as described herein.

At 922, the system can exchange electronic communications with the water device controller, the installer's mobile device, and/or the customer's user device(s) in order to determine what type of installation support is needed, and then to connect the installer and/or the customer to the appropriate resources and/or services. In various embodiments, the system can coordinate static and/or dynamic support for the installation processes. Static support can include enabling the installer/customer to access existing audible and/or visual electronic materials, such as device-specific installation guides, user manuals, walkthrough/troubleshooting videos, etc. The system can use the identifier, product name, etc., to identify and obtain files comprising the materials and can send the files to the on-site user devices, or to an email address of the customer or installer, and/or can send hyperlinks to the online storage location(s) of the materials. Static support can also include determining and delivering the contact information for remote or on-site (i.e., determined using the location data) technical support. Additionally or alternatively, the system can coordinate dynamic support for the installation process.

Dynamic support can in some embodiments be an interactive software program. For example, the IoT application on the installer's mobile device can include or access (i.e., on the IoT platform) a device installation module comprising an interactive GUI that sequentially presents instructions for the installation steps to a device user, prompting the user to acknowledge successful completion of each step or identify an error or problem associated with the displayed instructions. The path through the GUI screens is determined by the user's selections. Dynamic support can also or instead be live technical support. The system can provide or connect the installer's device to a computer-based customer service platform so the installer can receive live audio or video help from a customer service agent. The system can automatically provide stored information associated with the water device, the installation site, and the subject water system to the customer service platform, or can retrieve such information when it is requested. The system can also receive credentials from an authorized agent on the customer service platform, and allow the authorized agent to make changes to the IoT platform data to facilitate the installation process. The system can coordinate with the installer and the customer service agent while performing the configuration processes 924, when appropriate.

In some embodiments, the installer's mobile device includes one or more video capture devices, as are standard in modern smartphones and tablet computers. The system can connect the mobile device to the customer service platform via video streaming, so that the customer service agent can see the water device and installation site and provide accurate instructions. Additionally, the mobile device can be capable of augmented reality (AR) computer graphics processing. For example, the mobile device can be a wearable AR device, such as a GOOGLE GLASS headset, or another dedicated AR device; or, the mobile device can be a smartphone, tablet computer, laptop, etc., having sufficient computing hardware to generate AR graphics. The AR device includes sensors that collect spatial information about the wearer's surroundings, and the AR device's processors process the graphical data of an executing software application, using the sensor data to generate and display a graphic overlay superimposed over a transparent layer, so it appears to the wearer as if the computer graphic objects are present in the wearer's actual environment. The system can determine that the installer's mobile device is capable of AR display, and can provide the installation support in a heads-up AR display that makes it easier for the installer to work. For example, graphic overlay of the AR display may provide a sequence of instructions (e.g., in text boxes) corresponding to the sequence of steps required to install the water system. The graphic overlay may, at each step highlight (e.g., provide a colorful graphic object at the location of) components of the water system that are relevant to that step, which may draw the installer's attention to such relevant components. Additionally, the graphic overlay of the AR display may include a graphic object that plays an installation video, and that may be disposed at a physical location (e.g., which may be selected by the installer) or that may be disposed at a location that dynamically changes to remain in the field of view of the installer.

Figure 9B:
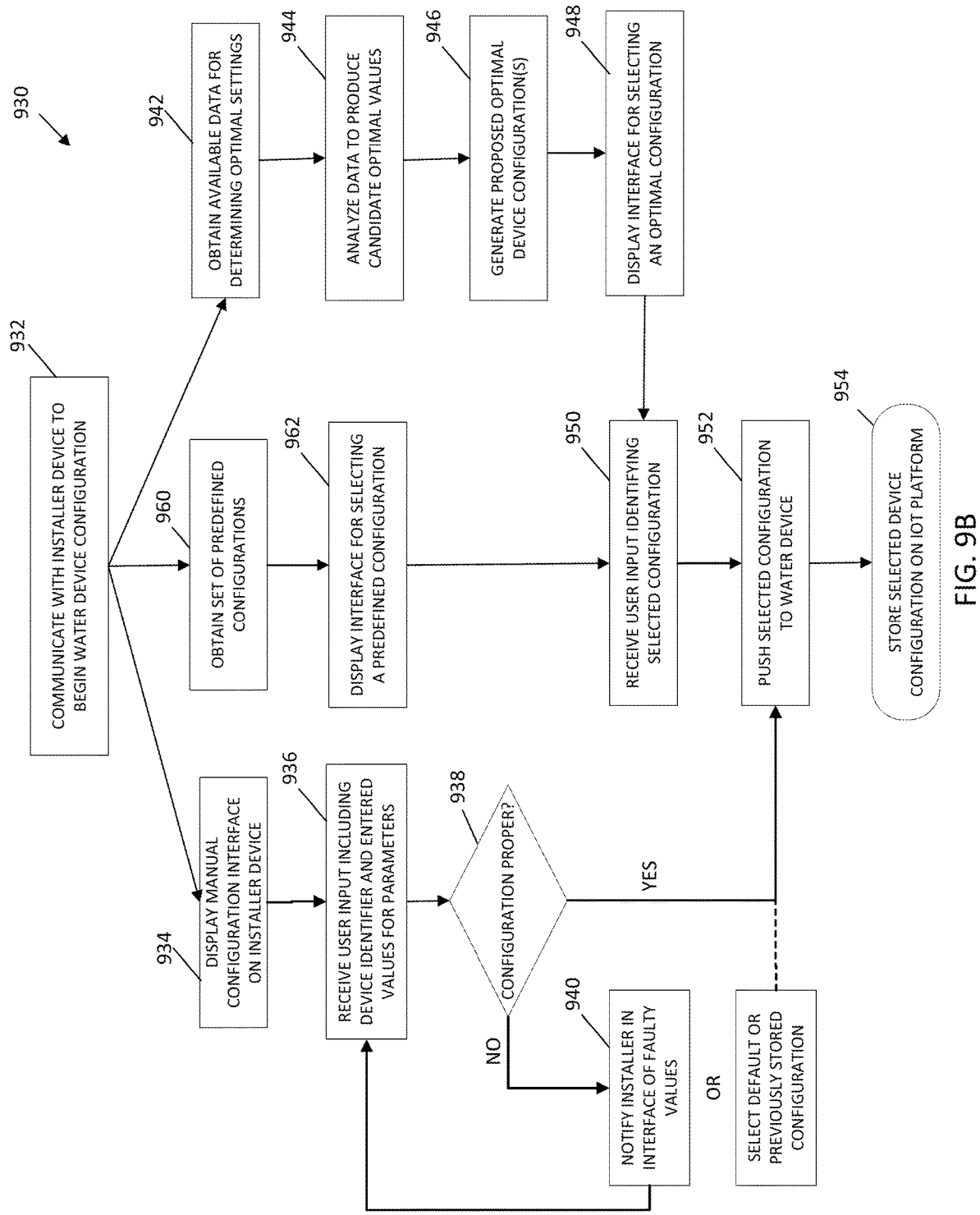

FIG. 9B provides an example method 930 for the water device configuration processes. The water device can have several properties, functions, and/or states that can be monitored and/or controlled electronically according to parameter settings; the device's associated electronic peripherals, such as controllers, IoT devices, sensors, and actuators, can have their own configurable parameters as well. A device configuration includes some or all of these settings, and can further include status variables storing the current associated values and static properties set at a particular time, such as upon installation (e.g., device identifier, installation timestamp). Different types of water devices, and different versions of the same water device, can have different configurable parameters in the corresponding device configuration. In various installation environments, the device configuration parameters of a particular water device are varied to make the water device perform at an optimal level. In some embodiments, the water device can be shipped from the vendor with a default device configuration applied, or with a set of default device configurations stored in memory and selectable by the installer as the default configuration when the water device is first powered up. In other embodiments, the water device's controller/IoT device can be pre-programmed with an initial configuration routine that, when executed and when the controller is connected to a communication network, automatically connects to the system or to an electronic storage location storing the default device configuration, "pulls" (i.e., retrieves) the default configuration into local memory, and applies the default configuration.

At 932, the system can communicate with the installer device to begin the configuration process (either setting the initial configuration or replacing the default configuration). In some embodiments, the system allows the installer to choose whether to select a predefined configuration from a set of predefined configurations, or to manually enter a configuration. Additionally or alternatively, the system may enable the installer to request that the system determine an optimal configuration or a set of proposed optimal configurations based on available data. If the system determines that the installer wants to manually enter the configuration, at 934 the system can cause the installer device to display one or more interface screens presenting each parameter and an associated data entry field for entering the parameter's value. The possible values for a given parameter can be limited, such as by requiring input data in the field to have a certain formation, or by displaying a drop-down list of selectable valid values. The fields can be blank, or can be populated with default or templated values. In some embodiments, the installer can enter the requested values and submit the device configuration, causing the configuration to be sent to the system. Additionally or alternatively, the entered device configuration can be stored in local device memory and applied to the water device and associated electronic components.

At 936, the system can receive the entered device configuration as user input transmitted from the installer's device. At 938, the system can determine whether the entered device configuration is proper. For example, the system can determine whether all required fields have been completed, and/or whether any of the entered values violates an expected data format (e.g., contains letter characters where numbers are expected) or is outside of an allowable range. If the configuration is proper, the system can continue to 952. If not, in some embodiments at 940, the system can update the user interface displayed on the installer's device to indicate that the entered configuration was not accepted. The indication can include an identification of the fields that contain improper values. This allows the installer to correct any faulty values and resubmit the configuration, which the system then receives (936). In another embodiment, at 940 the system can select a default device configuration, or a device configuration that was previously stored, and can proceed to 952.

If the system determines that the installer wants to select a predefined configuration, at 936 the system can obtain the set of predefined configurations from a data storage location. For example, the system can determine the device type using the identifier, and can query a water device data store (e.g., controlled by the manufacturer) using the device type to obtain a set of predefined configurations for the water device. At 938 the system can cause the installer device to display one or more interface screens presenting the obtained configurations for review and selection. For example, each of the predefined configurations can include a title and a description of characteristics that are imparted on the water device's operation when the associated device configuration is applied; the user interface can list the titles and descriptions and send the installer's selection to the system as user input, which the system receives at 950.

If the system determines that the installer wants the system to determine one or more proposed optimal configurations, at 942 the system can obtain available data, from various data sources, that describe contributing factors to a determination of the optimal settings for the water device. Alternatively, the water device can be configured to automatically request an optimal device configuration from (and send relevant data to) the system once the water device establishes a network connection. In some embodiments, the system can access one or more data stores storing previously analyzed configuration data. The previously analyzed configuration data can be derived from IoT device data and/or vendor data collected from some or all of the water devices that have been installed in a water system and connected to the IoT platform. Such water devices can include the water devices associated with the customer, and/or with the installer's company, and/or with the vendor/manufacturer, etc., as described above. In some embodiments, the previously analyzed configuration data can include one or more device configurations for each type of water device, which have been associated through data analysis with deployed water devices that exhibit characteristics of high performance. Various non-limiting examples of characteristics that, through data analysis, can be at least partially attributed to particular device configurations include: relatively long service life; relatively few tracked maintenance issues or service calls; consistently high output water quality (i.e., for drinking water filters); relatively low power consumption; relatively low operating cost (e.g., low power/water cost, attributable to operating time-of-day); consistent network connectivity; etc. The system can obtain previously analyzed configuration data associated with the type of the water device being installed.

In some embodiments, the system can access one or more data stores storing aggregated performance data collected from some or all of the water devices that have been installed in a water system and connected to the IoT platform, and describing the performance of the various water devices. The system can obtain identifying information for high-performing water devices of the type of the water device being installed, and can also obtain the performance data for the identified devices; this data can be used for cross-referencing as described below. If the system has access to the manufacturer/vendor data stores, the system can use the identifying information to obtain installation data, such as the date and location of installation, for the identified high-performing water devices. The system can access one or more data stores storing geographic data as well, and can obtain current and/or historical data describing characteristics of the geographic area containing the installation site. Non-limiting examples of environmental conditions that can be described in the geographic data, and that can affect water device performance and implicate a reconfiguration to address the conditions, include: topological conditions such as soil content; water quality; elevation and elevation changes; seasonal air temperature, humidity, and weather patterns; sunrise/sunset times; local plants and animals; etc. This data can be used for cross-referencing with other collected data as described further below.

In some embodiments, available data may include current water system data that can be obtained by the water device or by other devices in the customer's water system. The system may execute step 942 at a time that the water device has been sufficiently enabled to collect particular data points that are useful to optimize the device configuration. For example, the water device may be physically connected to an input water source, and the water device's water quality detector may be actively collecting data describing the water quality of the input stream into the water device; the system can communicate with the water device to obtain the water quality data. Additionally or alternatively, the system can determine whether another connected device in the customer's water system is collecting the relevant data, and can obtain the data from the connected device if so. It will be understood that any of the above-referenced data points collected from aggregate data and other sources can be useful to obtain at the current time, directly from the relevant water system, in order to set the device configuration optimally.

At 944, the system can analyze the collected available data to determine one or more candidate optimal values for each configurable parameter. This analysis can include cross-referencing the data from disparate sources to determine parameter values that correlate to high performance of the same type of water device in comparable installation environments. For example, high-performing devices can be limited to those installed within a certain geographic proximity to the installation site, or in the same climate. Current or previous data collected from the customer's water system can further narrow the possible values through correlation of high-performing devices having similar inputs. For example, the system can use the water quality measurement reported by the water device to identify high-performing devices that operate on an input stream of similar water quality. In some embodiments, the system can apply machine learning algorithms to the available data. For example, the system can format the available data into a feature vector representing the device configuration parameters; each element of the feature vector can be an array of N values, where N is the number of high-performing water devices being analyzed, and the corresponding parameter values of each high-performing device configuration can be stored in the feature vector. The feature vector and the other available data (e.g., correlated geographic and water system data) can be provided as inputs to a supervised or unsupervised machine learning model, and a range of optimal values for each configuration parameter can be output from the model. The machine learning model may be trained to output an estimated optimal configuration parameter value (sometimes referred to herein as a "candidate optimal value") for each configuration parameter represented in the feature vector, based on the feature vector and/or the other available data.

At 946, the system can generate one or more proposed device configurations each incorporating parameter values from the produced candidate optimal values. In some embodiments, a single optimal device configuration is produced. In other embodiments, a set of proposed configurations is produced; at 948 the system presents the set in a user interface on the installer device. At 950, the system receives the user input comprising the installer's selection of a configuration and/or manually entered configuration values. At 952, the system can push the selected device configuration (i.e., the manually-entered/custom configuration, selected predefined configuration, or single/selected optimal device configuration) to the water device's controller/IoT device. The controller/IoT device can store the device configuration in memory, and apply the device configuration in any control and/or monitoring algorithms associated with the water device and its peripherals (sensors, flow meters, smart relays, etc.). At 954, the system can store the device configuration in the record(s) associated with the water device (e.g., using the water device's identifier as a primary key) in any of the data stores associated with the IoT platform and/or the manufacturer. The IoT platform and other systems can subsequently use stored current and previous device configurations to analyze water device and water system performance and conditions (i.e., by accounting for the device configuration(s) that was/were applied to the water device at given time or over a given time period), and can include the device configuration(s) in aggregate data.

A predictive and preventative maintenance system operating on or in connection with the IoT platform can be configured to monitor and/or control any water device that is installed into the customer's water system and connected to the IoT platform as described herein. The maintenance algorithms that the system can execute, examples of which are detailed below, analyze collected data describing the operation of water system devices in order to prevent or minimize maintenance issues, alert entities that can address expected problems in advance, and avoid downtime and degraded performance when possible. In some embodiments, various sensors, meters, and other detection devices are deployed in the water system for various general and specific purposes; some sensors monitor or measure one or more properties associated with the water system overall, or with various portions, subsystems, or frameworks of the water system, while other sensors monitor or measure a property associated with a specific water device in the water system. For example, the water system can include a plurality of power consumption meters, including one to monitor power consumption of the entire water system, one or more to monitor each subsystem (e.g., pool/spa system, sump system, water softening system), and one or more to monitor each water device. A given water device may be monitored by certain sensors selected according to the type of water device, the location of the water device in the system, the criticality of the water device to system operation, the likelihood a particular maintenance issue or other event may occur, the cost of implementing the sensors, etc. Sensor data can be reported to the IoT platform directly by the sensor, via a device controller or IoT device electrically connected to the sensor, or through any other suitable communication path, as described above.

The system can collect the sensor data, as well as various state data of the water devices, such as the device configuration, the positions of switches and valves, the network connection details, etc. The system can also collect data from sources outside of the water system, such as the building's electrical system or other systems, aggregate data collected by the IoT platform from other water systems, water device data provided by the manufacturer(s) of water devices in the water system, weather and other environmental data services, etc., as described above. In some embodiments, the system can compile and analyze various elements of the data collected from these disparate sources to produce device health and system health profiles describing the usage, behavior, and operational performance of various water devices and subsystems within the water system. Generally, a health profile can include one or more "signatures" derived from measurable performance characteristics described in the collected data. A signature can represent a detected pattern in how the measured value(s) of one or more performance characteristics change(s), either over a given time frame or in apparent correlation with the occurrence of an event (or multiple events) or the presence of a condition (or multiple conditions).

The system can generate and use different types of signatures, such as a signature indicating the water device is operating normally (i.e., a "normal operation" or "normal use" signature), and a signature indicating the device's operation is not normal, or more specifically indicating the device is having or may soon have a particular problem (i.e., a "problem" or "predictive" signature). Relatedly, the system can determine that the water device is NOT exhibiting the condition represented by the signature, if the corresponding operating characteristics of the water device deviate from those defining the signature. For example, a device's water use signature may be used, alone or together with those of other devices in the water system, to determine that there is a leak in the water system, and to locate the leak (i.e., by determining which water devices and/or sensors are reporting an excessive flow rate or volume relative to their normal signatures). In other embodiments and examples, signatures can be used in comparisons to real-time operational data to determine that certain water devices in the water system are operating normally; in the context of detecting a present or potential future problem or maintenance issue in the water system, the system can use the information that some devices are operating normally to refine a diagnosis of the problem. For example, the system may determine that water and power usage at a filter pump are normal, and water devices upstream of the filter pump are operating normally, but water usage, pressure, output, etc., at a point-of-use downstream of the filter pump is abnormal; the system may use this information to determine that a water leak is present in the water line between the filter pump and the point-of-use.

Figure 10:
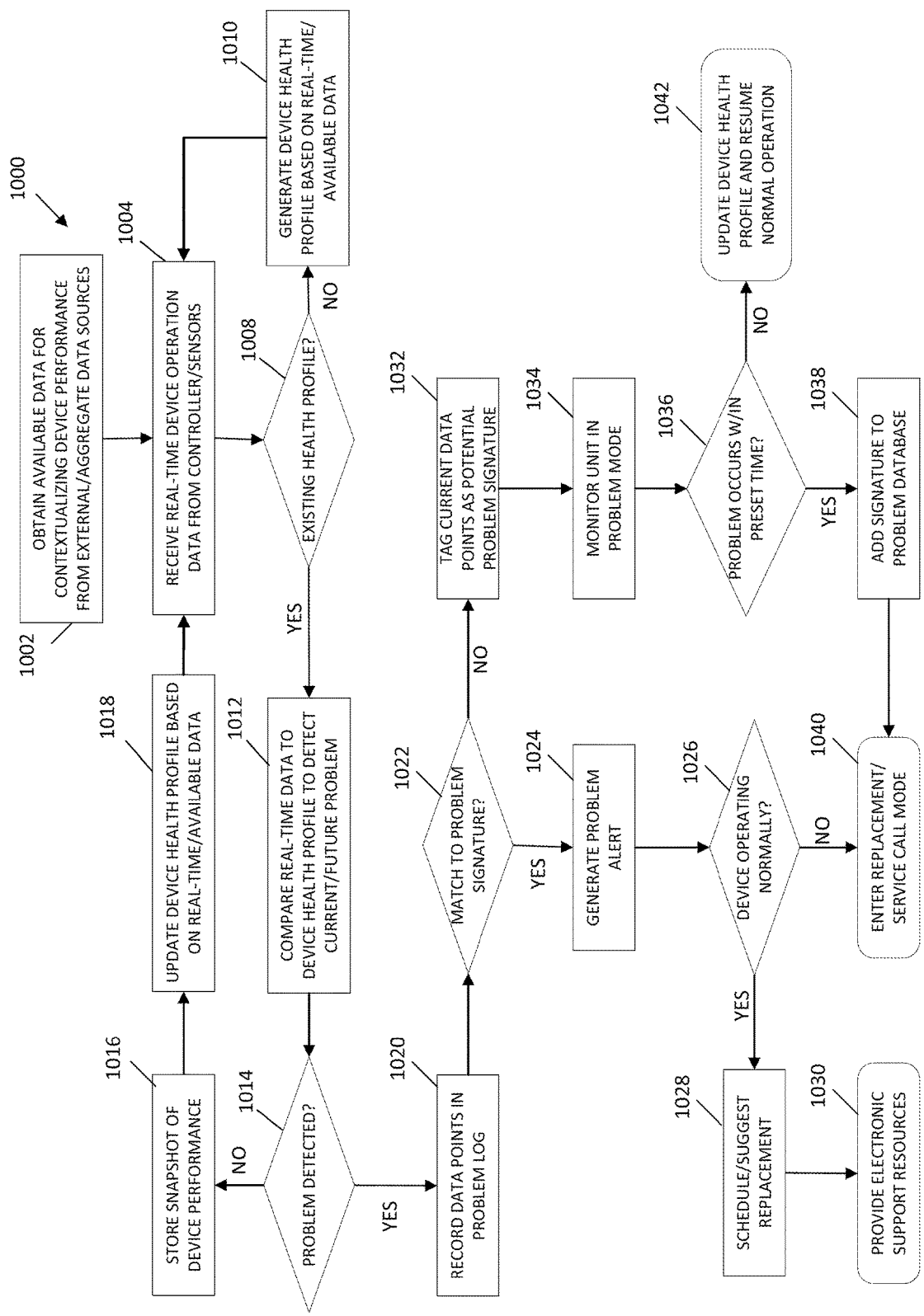
FIG. 10 is a flowchart of an example embodiment of a method for developing device health profiles and using the profiles to detect, predict, and address maintenance issues in water devices.

FIG. 10 illustrates an example method 1000 performed by the system to generate and use a health profile for a water device, such as a pump, a filter, a heater, etc., installed in the water system. At 1002, the system collects data available from external data sources that, as described above, can be analyzed to possibly provide insight into the water device's performance. For example, data sources describing current and/or historical characteristics of the water device's geographic location, such as typical temperature, rainfall, and water quality, can be collected. The system can also collect data from data sources storing aggregated data of the IoT platform. For example, in some embodiments one or more signatures in a device health profile can be based at least in part on a type, and further on one or more subtypes, of the water device; the system can collect device health profiles, signatures, and/or raw data associated with the same type/subtype devices deployed in the user's water system or in other users' water systems. For example, a normal operation signature may be associated with power consumption of a device—i.e., the watts used by the device at different measurable phases of operation, such as startup, steady-state, maximum duty cycle, etc.; a signature based on power consumption can also be generated for a device type, such as a filter vs. a pump, as well as for a device sub-type, such as a swimming pool pump filter, a brewery filter, a drinking water filter, etc. Additionally, signatures may be based on different characteristics depending on the type or sub-type. For example, a brewery filter may be associated with signatures that monitor residual dissolved oxygen content in the output water, which may not be a relevant characteristic for a swimming pool pump filter.

The system can generate (e.g., using the method 1000) one or more libraries of device behavior signatures. In various embodiments, signatures in the libraries can account for, and can be categorized by, various characteristics (and combinations thereof) pertaining to the water device, the water system or subsystem, the geographic and/or environmental details of the water system location, etc. In one embodiment, a first set of libraries can store normal operation and problem signatures for water devices, where each library is dedicated to a particular manufacturer's products. At 1004, the system can receive or collect real-time device operation data describing the operating conditions of the water device. For example, the system can obtain the state (e.g., on or off) of a switch on the water device from the device's controller, as well as the value of any property observed by a sensor or meter (e.g., pressure, flow rate) associated with the water device. The water device's in-force device configuration, and previous device configurations, can also be collected.

At 1008, the system can determine whether the water device already has a stored device health profile associated therewith. For example, the system can query a device health profile data store associated with the user, using the water device's identifier as a primary key. If there is no existing health profile, at 1010 the system can generate a health profile based on the available data. For example, the system can presume that the water device is operating normally, and can use the initially-reported values from the controller and sensors as baseline values for normal operation. If the system does identify an existing device health profile for the water device, at 1012 the system can compare the real-time data to the device health profile to determine whether the device is operating normally, or is exhibiting potentially problematic behavior (e.g., which may be indicated by a deviation of the real-time data from a normal operation signature of the health profile, where the deviation may be characterized by one or more variables represented in the real-time data differing from corresponding variables of the normal operation signature by a threshold or group of thresholds). For example, the system can compare reported values from the device's sensors to a "normal operation" signature and/or to one or more "problem" signatures in the device health profile. At 1014, the system can determine whether the collected data indicates the water device has a problem. For example, if the reported sensor values deviate a predetermined amount from the normal operation signature, or if they are similar to a problem signature, there may be a problem. If no problem is detected, at 1016 the system can store a "snapshot" comprising the current operational data in one or more data stores associated with the user and/or the IoT platform, and at 1018 the system can incorporate the snapshot data into the current device health profile. For example, the system can update signatures for the specific water device (i.e., in user account storage) and/or for the type/subtype of the water device. In some embodiments, the system can automatically and repeatedly generate (1010) and/or update (1018) a device health profile and/or a signature thereof at a predetermined interval. In some embodiments, and/or for some or all characteristics being analyzed, the system can compile data spanning the entire interval, or on a rolling basis, in order to provide a suitable resolution of the data or to show a trend in the associated value(s). For example, the system can store a default time window, or can receive a selected time window interval from the user; the system can collect real-time and available data over a first time window, analyze the data as described above, and then store a "snapshot" comprising a data structure that stores the captured data for the time window. The snapshot can be stored in the aggregated data store, the user data store, etc.

If at 1014 a problem is detected (i.e., the device operation deviates beyond a threshold amount from normal operation), the system can (at 1020) store the data points representing the current operating conditions in a temporary problem log for further analysis. At 1022, the system can determine whether the data points match (or at least substantially match) a problem signature (e.g., stored in a library). For example, the data may indicate a problem is present or emerging if the collected data is within a threshold of the corresponding values in the signature, and/or are approaching the signature values at or exceeding a predetermined rate. Non-limiting examples are described below with respect to the Figures. If the data points do match a problem signature, at 1024 the system can generate an alert and deliver the alert to the user, notifying the user of the existing or emergent problem condition(s). At 1026, the system can determine whether, even though the problem signature is present, the water device is nevertheless operating normally. If not, at 1040 the system can exit a normal operation mode and enter a device replacement/service call mode, in which the system can, via user interfaces and/or automated commands to customer service, help the user deactivate and repair/replace the malfunctioning water device. If at 1026 the device is operating normally, the situation may not be an emergency; at 1028 the system can automatically assist the user to schedule a repair or replacement of the device. Further, at 1030 the system can automatically provide to the user any available electronic support resources. For example, the system can send a notification containing links to product troubleshooting guides and/or videos, and/or can connect the user (i.e., via the user's device) to an available customer support agent by contacting a customer support service.

If at 1022 there is no matching problem signature, the system can at 1032 tag the current set of data points as a potential new problem signature. At 1034, the system can exit a normal operation mode and enter a device monitoring mode, during which the system can collect additional data and/or can collect the same data more frequently, and can continue analyzing the data to predict or immediately remediate a problem. In some embodiments, the system can remain in the device monitoring mode for a predetermined period of time; if at 1036 a problem has not occurred within the monitoring time, at 1042 the system can update the device health profile (as in 1018) and resume normal operation. If a problem does occur (e.g., the user reports a problem, or the device malfunctions), at 1038 the system can identify the problem and then store the data points as a new problem signature in the signature library. Additionally, at 1040 the system can enter the replacement/service call mode.

Figure 11:
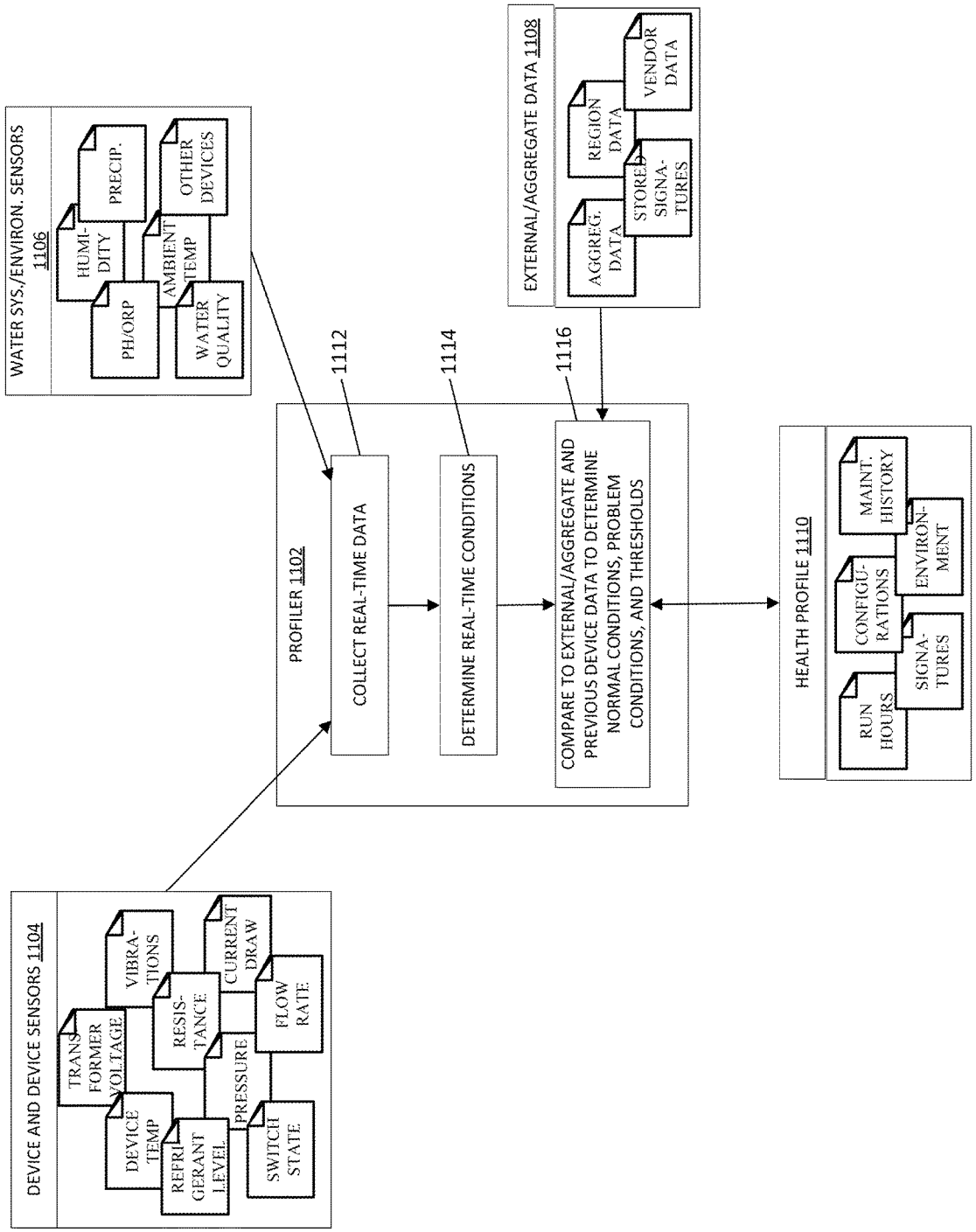
FIG. 11 is a diagram of an example embodiment of a computer-implemented profiler for developing device health profiles and using the profiles to detect, predict, and address maintenance issues in water devices.

Referring to FIG. 11, a system, such as the set of servers implementing the IoT platform described above, can generate and maintain health profiles for a water system and one or more constituent components (e.g., a water device; a subsystem; a sensor or meter) using data processing algorithms such as the method 1000 of FIG. 10. The appropriate data to be collected, whether it be real-time or previously stored, and whether it be from the water system or particular devices 1104 thereof, or from environmental sensors 1106, or from internal or external data stores, can depend on the water device or subsystem being profiled. Non-limiting example values collected as real-time data from the device, system, or environment, are shown; example data classes stored by internal and external data sources 1108 are shown; finally, non-limiting example data elements of the health profile 1110 itself, which can be used to update a health profile (e.g., by improving a signature and/or identifying a new signature), are also shown. A profiler 1102 can be implemented on a server, or on an end-user customer's device, or on a water device, or on any combination thereof; in some embodiments, the profiler 1102 can be a centralized or distributed software program comprising modules of program instructions that each respective computing device is configurable to execute. For example, a pool heater controller and an IoT platform server can cooperate to implement a profiler 1102 for the pool heater. At step 1112, the profiler 1102 can collect real-time data from the pool heater controller and the associated sensors, as well as from other water system and environmental data sources (e.g., water quality and/or pH sensors, ambient temperature, etc.). At step 1114, the profiler 1102 can determine the real-time conditions of the pool heater's operation and its surrounding environment (e.g., high and low temperatures, flow rate, blower speed, blower motor windings status (determined from motor current, resistance, and temperature sensors), transformer voltage, refrigerant level, etc.). At step 1116, the profiler 1102 can incorporate stored data to determine one or more signatures of the normal and abnormal operations of a pool heater. Further, for the pool heater and any other water device, the profiler 1102 can maintain a "watch list" of water devices that do not match typical system data, to identify how certain signatures correspond to (good/bad/normal/problematic) device performance. For example, the profiler 1102 can determine a signature describing an unusual pattern of overcurrent that recurs in a certain type of pump; over time, the profiler 1102 may determine that this pattern corresponds to a high incidence of premature pump failure, and can thus predict this product defect by detecting the failure signature before the pump fails.

In some embodiments, the profiler 1102 can set limits for operational characteristics such as device or system-wide maximum water usage. For example, the profiler 1102 can use the device's location data to obtain, from an external data source 1108 storing city ordinances, the local water use limits; the profiler 1102 can parse the obtained ordinances to produce a schedule in which water usage limits correlation to times of day, days of the week, etc. The profiler 1102 can send the schedule to the water device memory, to be followed by the controller, and/or can store the schedule in remote data storage, from which the limits can be applied by remote servers and/or IoT devices. In some embodiments, the profiler 1102 can assign weights to signatures, and/or to ranges of data point values within a signature, according to the frequency at which these signatures/values occur in the aggregated IoT platform data. The profiler 1102 can also incorporate machine learning algorithms, or communicate with a machine learning platform, in order to develop self-learning functionality that enables automatic identification of patterns in related device data. The profiler 1102 can also update aggregated metrics describing the water device that are stored in the device health profile 1110 and/or other aggregated data stores 1108. For example, the device health profile 1110 can track factors impacting the life expectancy of the water device, such as the total run hours (i.e., hours the device has been powered on), which are calculated by aggregating elements of the collected real-time data. The profiler 1102 can update run hours, for example, by calculating the length of time during the current time window that an electric current sensor or power consumption meter associated with the water device was reporting a non-zero value, and adding the length of time to the current run hours value. In another example, the device health profile 1110 can be configured to include a complete maintenance history of the water device. In some embodiments, the maintenance history can be stored as a database, lookup table, spreadsheet file, etc., storing a plurality of records each describing a maintenance event associated with the water device. The maintenance history can be stored in a data store associated with the IoT platform, or in another data store remote from the device and not necessarily in the user's control. For example, the IoT platform can maintain a maintenance history database storing the maintenance histories for some or all of the water devices connected to the IoT platform. In this manner, should ownership of the water device transfer or be offered to another party, the (potential) new owner can obtain and review the maintenance history of the water device, which can be a factor in deciding whether to purchase or replace the device. The maintenance history can begin, for example, with a record describing the installation of the water device on the installation date, and can include records for configuration changes, component replacements (e.g., filter media in a filter), repair and routing maintenance services, customer support interactions, system-generated alerts, etc. The profiler 1102 or another service of the IoT platform can collect, as real-time or other available data, information about maintenance events and add records to the maintenance history to track them.

Figure 12:
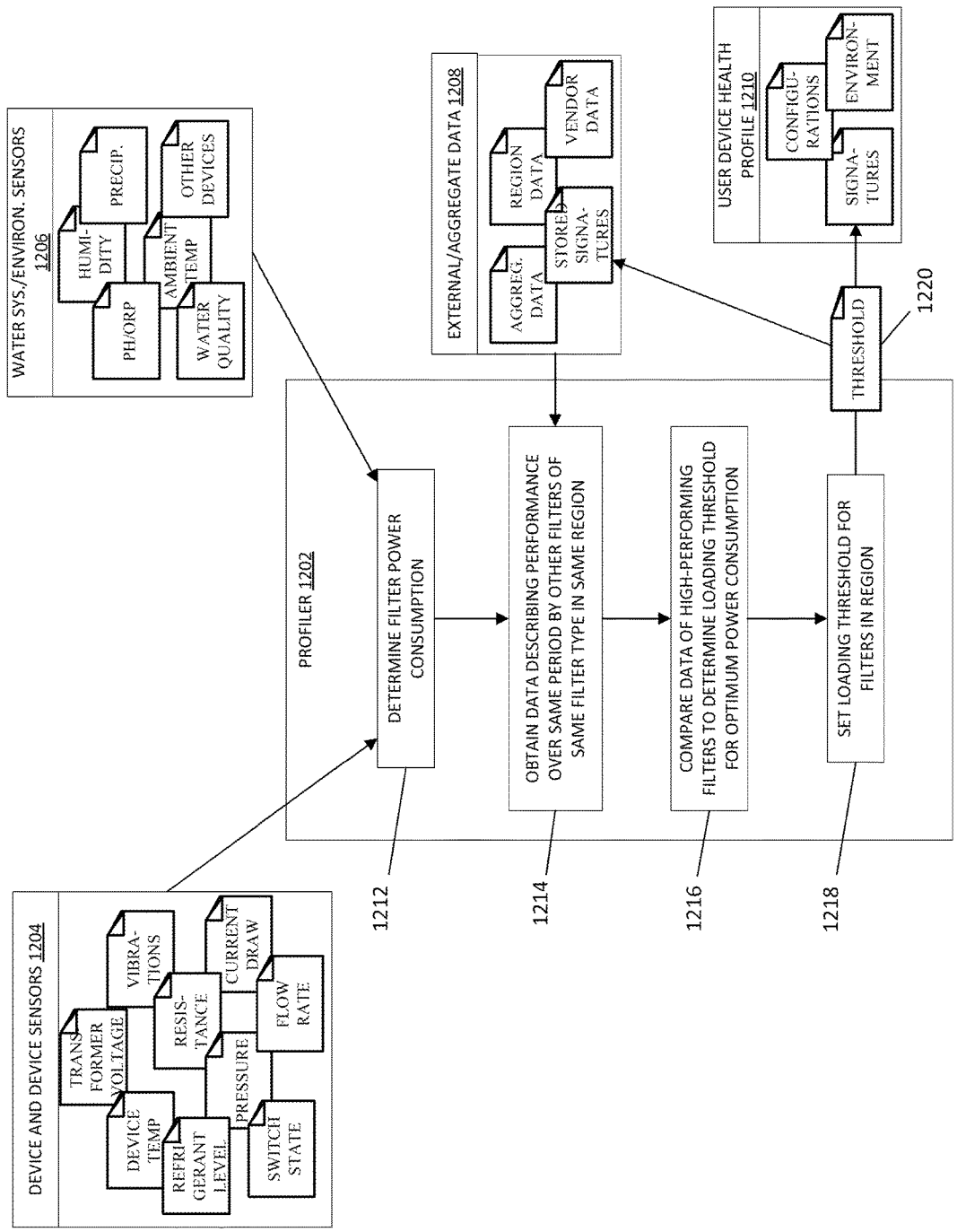
FIG. 12 is a flowchart of an example embodiment of a method for developing device health profiles for filters in a geographic region.

FIG. 12 provides another example of a profiler 1202 as in FIG. 11, which can be implemented on any or all of an IoT device, a filter or filtration system controller, a main water system controller or hub, and one or more remote servers implementing the IoT platform described above. Example controller and sensor outputs, and example outputs of water system and environmental sensors, meters, and other data sources, which the profiler 1202 can use to determine power consumption of the filter are shown as device and device sensors 1204 and water system/environmental sensors 1206. At step 1212, the profiler 1202 can determine the current point-in-time power consumption (e.g., in W/h) and/or other snapshots of the power consumption, such as month-to-date, daily average or a predetermined time period, etc., which may be obtained from the device and device sensors 1204 and/or the water system and/or environmental sensors 1206. At step 1214, the profiler 1202 can obtain data (e.g., from external/aggregate data sources 1208) describing the performance of other filters of the same filter type/subtype for comparison; the comparative filter data can further be narrowed by geographic region, for example. At step 1216, the profiler 1202 can rank the data to determine a set of high-performing filters, and can determine based on the filter data (e.g., the raw aggregated data, and/or the corresponding signatures) a loading threshold 1220 representing the optimum power consumption limit for a filter having the present filter's environmental (e.g., climate, time-of-year) and device characteristics (e.g., age of filter device, date since last filter media changed, etc.). At step 1218, the profiler 1202 can set the loading threshold for all filters in the region corresponding to the present filter's environmental and device characteristics.

Generally, filter pressure increases as the filter fills with retained solids, until the filter is backwashed or replaced. When filter pressure is monitored, backwashing the filter causes the operational filter pressure to drop back to normal levels. The profiler 1202 can determine a correlation between filter pressure and power consumption—essentially, as filter pressure increases, more power is required to drive the filter pump and flow input water through the filter media. Thus, for example, the loading threshold can be determined as a top limit of the device's power consumption before a filter backwash is recommended or automatically performed. In some embodiments, the loading threshold 1220 can be stored in the user's water device health profile 1210 (i.e., as a signature), and/or can be saved in the stored signatures for filter devices of the same type in the same region, which may correspond to the external/aggregate data 1208.

Figure 13:
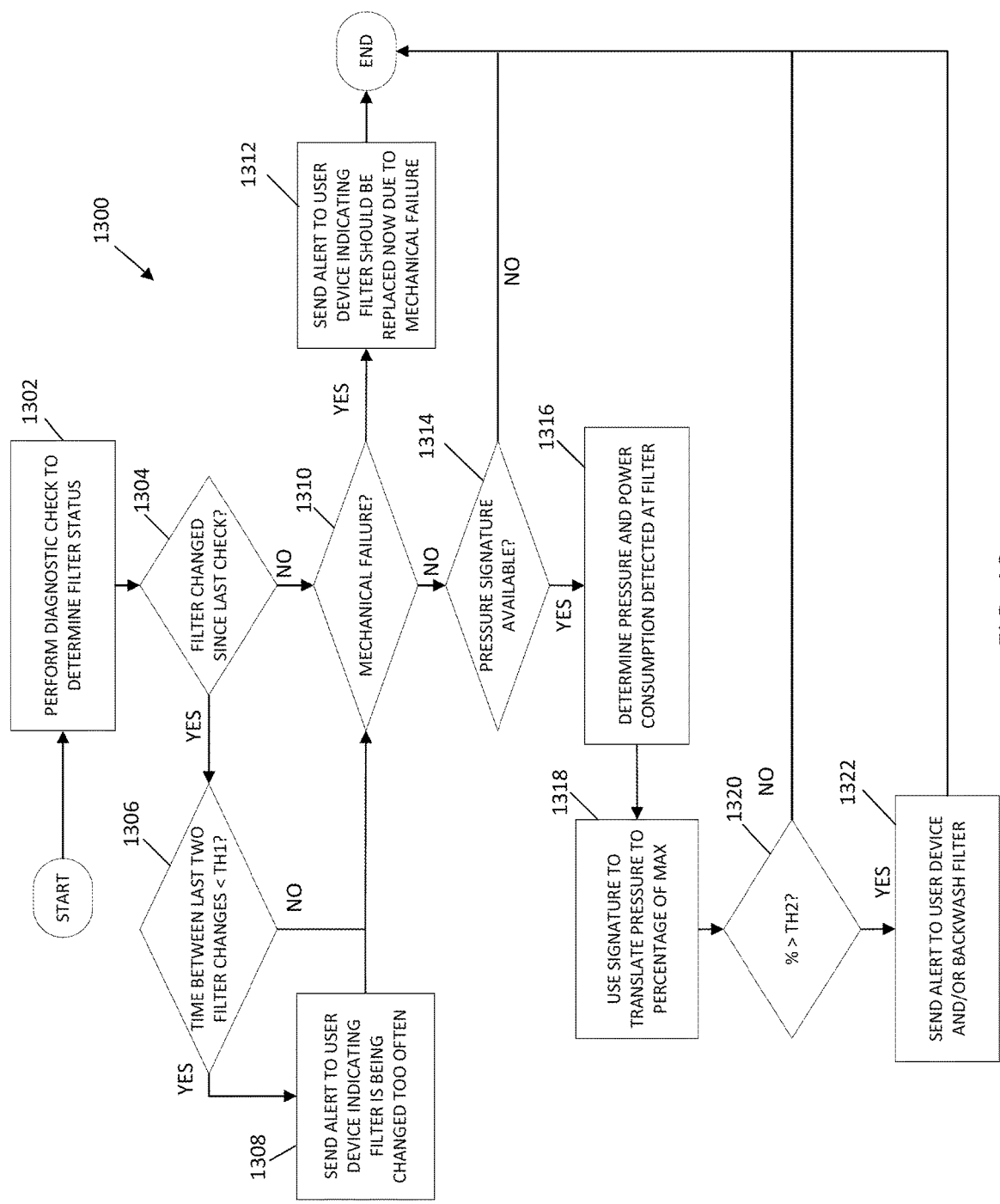
FIG. 13 is a flowchart of an example embodiment of a method for using a device health profile for a filter to detect maintenance issues.

In other embodiments, the filter or filtration system can be equipped with a pressure sensor, such as a pressure transducer; a profiler can generate one or more signatures that include the filter and/or housing pressure as a data point. Referring to FIG. 13, a method 1300 of predicting a filter maintenance issue can be performed by an on-device and/or remote system that uses pressure sensor data, together with a profiler, to manage the filter. At 1302, the system can perform a diagnostic check to determine the filter status. For example, a remote server or other communication device of the system can send status request messages to a controller of the filter or filtration system as described above; additionally or alternatively, the system can send commands to the filter controller that places the filter into a diagnostic mode. Subsequently, the system receives responses to the commands/messages, and determines the values of filter status parameters from the content of the responses. In another example, the system can determine the filter status from other sources of diagnostic information, such as directly from device, water system, and/or environment sensors, as well as from the device health profile.

In some embodiments, the system can check for "over-cycling"—that is, replacement of the filter that is too frequent—based on the diagnostic information. For example, the device health profile or the filter controller may store a date that the filter was last changed, as well as a date of the last diagnostic check of the filter. At 1304, the system can determine if the filter has been changed since the last diagnostic check. If so, the system checks whether the user is overcycling the filter—at 1306, the system determines whether the time between the last two filter changes is less than a stored minimum duration; if so, the system at 1308 can alert the user to overcycling, or changing the filter too often.

At 1310, the system can determine whether a mechanical failure has occurred. If so, at 1312 the system can enter a filter replacement mode and schedule a replacement as described above. If there is no mechanical failure, at 1314 the system can determine whether the IoT platform has generated and stored a signature for the filter pressure data. For example, the signature may define a maximum pressure at the filter of the filtration system and a threshold percentage of maximum pressure over which the filter should be backwashed. If so, at 1316 the system can determine, by processing the device, sensor, and environmental data, the pressure and power consumption detected at the filter. In some embodiments, the filter pressure at the filter may be calculated based on the power consumption (e.g., instantaneous power consumption, or power consumption measured over a predetermined time period) measured at the filter, rather than being measured directly. In such embodiments, a correlation may be determined between power consumption of the filtration system or power consumption of filtration systems that are characteristically similar to (e.g., of a similar type as, in the same geographic region as, and/or in a region with similar environmental characteristics as) the filtration system, and pressure at the filter of the filtration system or the similar filtration systems. This correlation may be included in the signature, or may be stored separately (e.g., in a memory of a remote server or a memory of the controller of the filtration system). The correlation may be used to translate between power consumption of the filtration system and pressure at the filter of the filtration system. At 1318 the system can use the signature to translate the pressure reading (i.e., measured or calculated pressure value) to a current percentage of the maximum pressure (e.g., which may be determined based on the loading threshold of FIG. 12) for the filter. At 1320, the system can determine whether the current percentage of the maximum pressure exceeds a threshold percentage of the maximum pressure TH2 (i.e., is too close to the maximum pressure). As an alternative to 1316 and 1318, the system can store a threshold associated directly with the measured pressure, such as a certain amount of pressure, or percentage increase, above the normal filter pressure, as opposed to being defined as a percentage of maximum pressure. In some embodiments, the normal filter pressure can be a manufacturer-specified value. Alternatively, the system can monitor the filter pressure for a set period of time after the filter is installed or cleaned, to determine the normal "clean" filter pressure value; the system can then calculate the threshold as an amount (e.g., 10 psi) or a percentage (e.g., 10%) above the measured clean filter pressure value.

If the measured pressure exceeds the threshold, at 1322 the system can send an alert to the user to backwash the filter, or automatically execute an unattended backwash cycle of the filter. For example, the filtration system can be equipped with a valve or other flow mechanism that can be actuated automatically to reverse the flow of water through the filter for a set period of time; the system can communicate with the filter controller to activate this backwashing mode. Additionally or alternatively, the system can send an alert to another entity in electronic communication with the IoT platform, such as a maintenance service provider, a dealer, or a manufacturer. In some embodiments, a threshold TH2 can be set relatively low (e.g., at a pressure indicating the filter media is 50% clogged) so that the system proactively alerts the user to a future (e.g., 2-3 months in the future) need to backwash or replace the filter media; the threshold can be replaced with a higher threshold, or a series of thresholds can be tested, and alerts with increasing urgency can be generated. In other embodiments, the system can determine that backwashing the filter is not sufficient, and the filter instead needs to be replaced. For example, the system can measure the filter pressure after the backwash is complete and determine that the pressure did not drop back to normal levels; the system can perform, or cause the user to perform, the backwash a second time, and if the pressure still does not drop, the filter requires manual cleaning or replacement, and the system can alert the user as such.

Non-limiting examples of environmental, geographical, and internal aggregate (i.e., from other water devices connected to the IoT platform) data that can improve the accuracy of the systems and methods of FIGS. 12 and 13 in predicting when the filter media should be backwashed or replaced include: water quality trends in the geographic region of the installation site, which may indicate variations in the type and amount of contaminants in the water based on the time of year; device health signatures from a signature library, describing (for example) variations in power consumption or filter pressure that are normal for the geographic area and/or time of year; vendor data describing normal operating parameters of the water device; device health signatures and other data, such as power consumption data, collected from other water devices in the same water system, including devices of other types (e.g., power consumption of a pool pump; remaining salt volume in a water softener); water, electricity, and/or gas usage metrics for the installation site, including water/electricity/gas costs and cost variations, and user-supplied limits on usage (e.g., when the user has provided a not-to-exceed total cost of water usage); water and product usage restrictions set by city or state ordinances/laws, etc.

Figure 14:
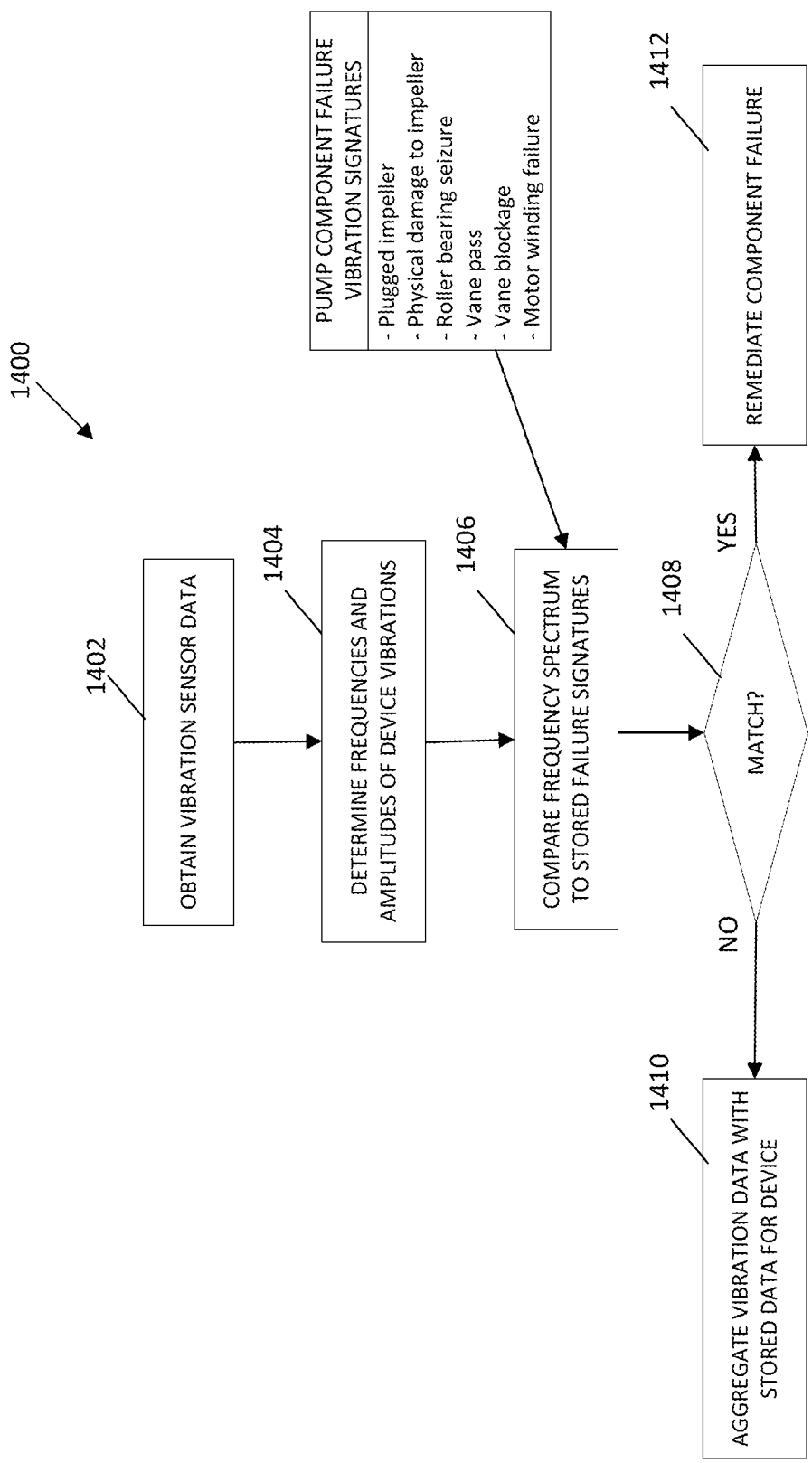
FIG. 14 is a flowchart of an example embodiment of a method for using a device health profile for a water pump to detect maintenance issues.

FIG. 14 provides another example of a process 1400 that a system can use to predict and prevent failure of pump components, such as motor bearings, impellers, and the like. The pump (e.g., IoT device 804 of FIG. 8) being monitored can be associated with a vibration sensor (e.g., sensors 840 of FIG. 8), such as a piezoelectric sensor, and a profiler can process vibration data generated by the sensor to produce one or more pump component failure signatures, such as those listed. At 1402, a system can obtain the current vibration data, such as by receiving the raw data from the vibration sensor. At 1404, the system can process the vibration data to determine the frequencies and amplitudes of vibrations in the generated data. At 1406, the system can compare the detected frequency spectrum (i.e., frequencies detected, and their amplitudes) to the failure signatures that were previously stored (i.e., in a library). At 1408, the system determines where there is a match or an approximate match. If not, at 1410 the system can aggregate the vibration data with previously stored vibration data associated with the pump and/or vibration sensor; otherwise, at 1412 the system can remediate the component failure, such as by generating an alert that includes a warning that the component is exhibiting failure behavior and/or that includes guidance for how the component failure can be corrected (e.g., via the network 806 of FIG. 8) which may include steps for replacing or repairing the component), or by contacting a service provider to schedule maintenance or repair of the pump.

The data represented in the user's device health profiles can be presented to the user in web-based or mobile interfaces. In various embodiments, the systems generating the interfaces can automatically: track and display real-time parameters, e.g. age and use of a product; compare real-time and aggregate parameters and metrics to safe parameters and aggregate data (e.g., 90% of pumps in region fail after X months) to predict and alert to maintenance issues; analyze conditions and recommend appropriate replacement products based on a product serial number (e.g., smaller pump, bigger filter, additional sensor, replacement for obsolete product); generate and deliver routing (e.g., monthly) communications (e.g., email) detailing system status, problems, and upcoming maintenance (e.g., "time to service" based on date of last maintenance); link notifications to digitally available instructions (e.g., video tutorial to repair/replace); connect the user to device-specific support, live or local serviceman (via stored service contact info), manuals, etc.; and, provide a live service portal (e.g., via smartphone video capability) for the user or an onsite technician. The systems can track screens and interfaces customers use most and optimize the interfaces accordingly. For example, the system can provide a self-learning interface that tracks impression frequency—i.e., the number of times that a user accesses a particular screen, in raw numbers or relative to other screens; the interface can then show screens that would be most useful to a given user in light of the user's usage history of the interface. Thus, if a user, or a group of users, or all users, access a certain screen or set of related screens in the interface very frequently, the interface may reconfigure itself to promote that section of the interface to a prominent navigational position to make it easier for a user to get to that section.

The systems can also generate interfaces for other entities, such as a service company dashboard that allows agents to monitor customers' products and provide proactive as well as responsive service. For example, a service person can pull a user's water device configuration from storage in the IoT platform, and can simulate pump/device operations based on configuration info, perform diagnostics, and resolve an issue. The systems can provide an augmented/virtual reality interface for a technician that is diagnosing the problem onsite or remotely.

Figure 15:
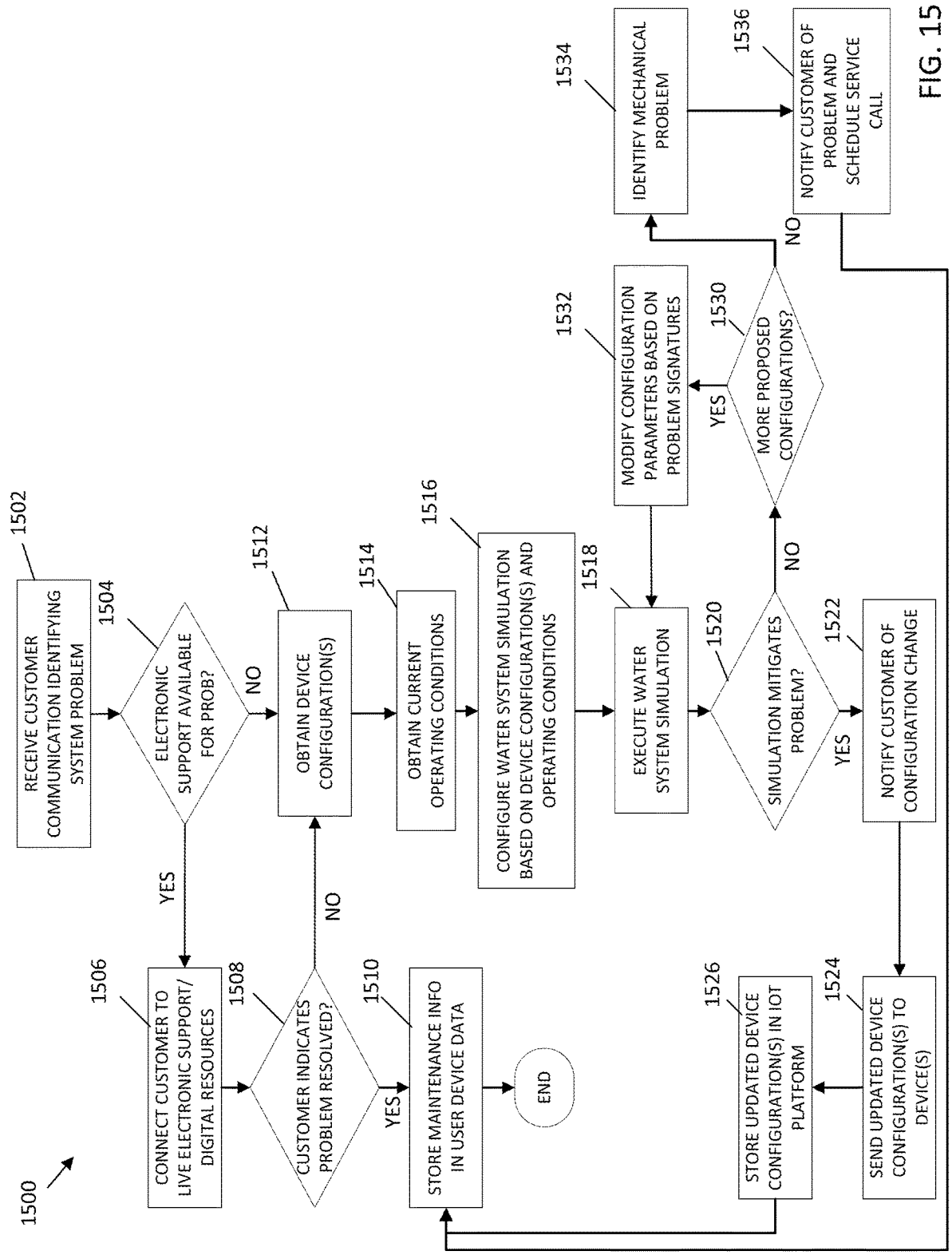
FIG. 15 is a flowchart of an example embodiment of a method performed by computing devices for automatically attending to a customer service issue.

FIG. 15 provides an example method 1500 executable by the above-described systems to facilitate a service call related to a network-enabled water device using an electronic service company dashboard. At 1502 the system can receive a customer communication indicating that there is a problem with the customer's water device or water system. For example, the customer can call into a service call center, or send an email or initiate an online chat or audio/video conference via the IoT application or a web portal. At 1504 the system can determine, based on information supplied by the customer and/or information stored in electronic data stores and associated with the customer, the water device, the geographic area, etc., whether electronic support, such as online and other electronic documentation, is available to help the customer resolve the problem on his own. For example, the customer communications or accessible customer account data may identify a particular water device that is installed in the customer's water system; the system may query vendor data stores and other available sources of information to determine whether electronic support resources for the water device exist.

If there are available electronic resources, at 1506 the system may connect the customer to the resources, such as by sending the customer copies of electronic documents or hyperlinks to online support (e.g., troubleshooting videos; support forums). At 1508 the system can later send follow-up communications to the customer, prompting the customer to indicate whether the problem has been resolved. Alternatively, the customer may initiate a communication indicating that the problem has or has not been resolved. If the problem is resolved using the electronic support resources, at 1510 the system can store information associated with the service call in one or more maintenance data records associated with the customer and/or the customer's devices. For example, the system can collect information from the follow-up communications to determine the solution the customer used; if the solution is associated with a maintenance issue that the system tracks (e.g., a manual backwash or replacement of a filter), the system enters the date and associated information about the solution into the device maintenance records.

If at 1508 the customer indicates that the problem is not resolved, the system can attempt automated resolution measures. At 1512 the system can obtain the device configuration of each of the devices implicated in the problem; this may be one device or multiple devices identified by the customer, or all of the devices in an affected subsystem, or all of the devices in the water system, depending on the context of the identified problem. The system can obtain the device configuration(s) stored as current configurations in a storage location on remote servers, or can obtain the device configurations directly from the devices or a controller of the customer's water system. At 1514 the system also obtains the current operating conditions of the water system and any implicated water device. This can include sensor data and other monitored data from the water system, as well as environmental data as described above. The device configuration(s) and current operation conditions of the water system may be collectively referred to as "water system data". At 1516 the system can configure a simulation of the customer's water system based on the water system data, and at 1518 the system can execute the simulation.

In some embodiments, the water system simulation can be configured (e.g., based on machine learning training sets developed from previously recorded water system operations) to determine whether an initial state of the simulation replicates the problem described by the customer. If not, the simulation may modify its parameters until the problem is replicated. Once the problem is replicated, the system can (at 1520, 1530, 1532) iteratively apply known solutions to determine whether the solutions can mitigate the problem. For example, the system can modify configuration parameters of the water devices until new configurations are obtained that mitigate the problem; the configuration changes can further be associated with known repairs, replacements, etc., as well as causes of the problem. At 1520 the system can determine at each iteration whether the simulation mitigates the problem. If so, at 1522 the system can advise the customer of configuration changes to be made and/or repairs, replacements, etc., to be performed. At 1524 the system can push the updated configurations to the respective devices, and at 1526 the system can send the updated device configurations for storage on the remote servers of the IoT platform. The system can then store any maintenance information in the customer's device data (at 1510) as described above.

At 1530, if after all proposed configurations have been simulated the simulation still has not produced a mitigation of the problem, there may be a mechanical problem with one or more devices. At 1534 the system may identify the mechanical problem, and at 1536 the system can notify the customer that there is a problem that requires service. The system can further schedule a service call for repairs. The system can then store any maintenance information in the customer's device data (at 1510) as described above.

Figure 16:
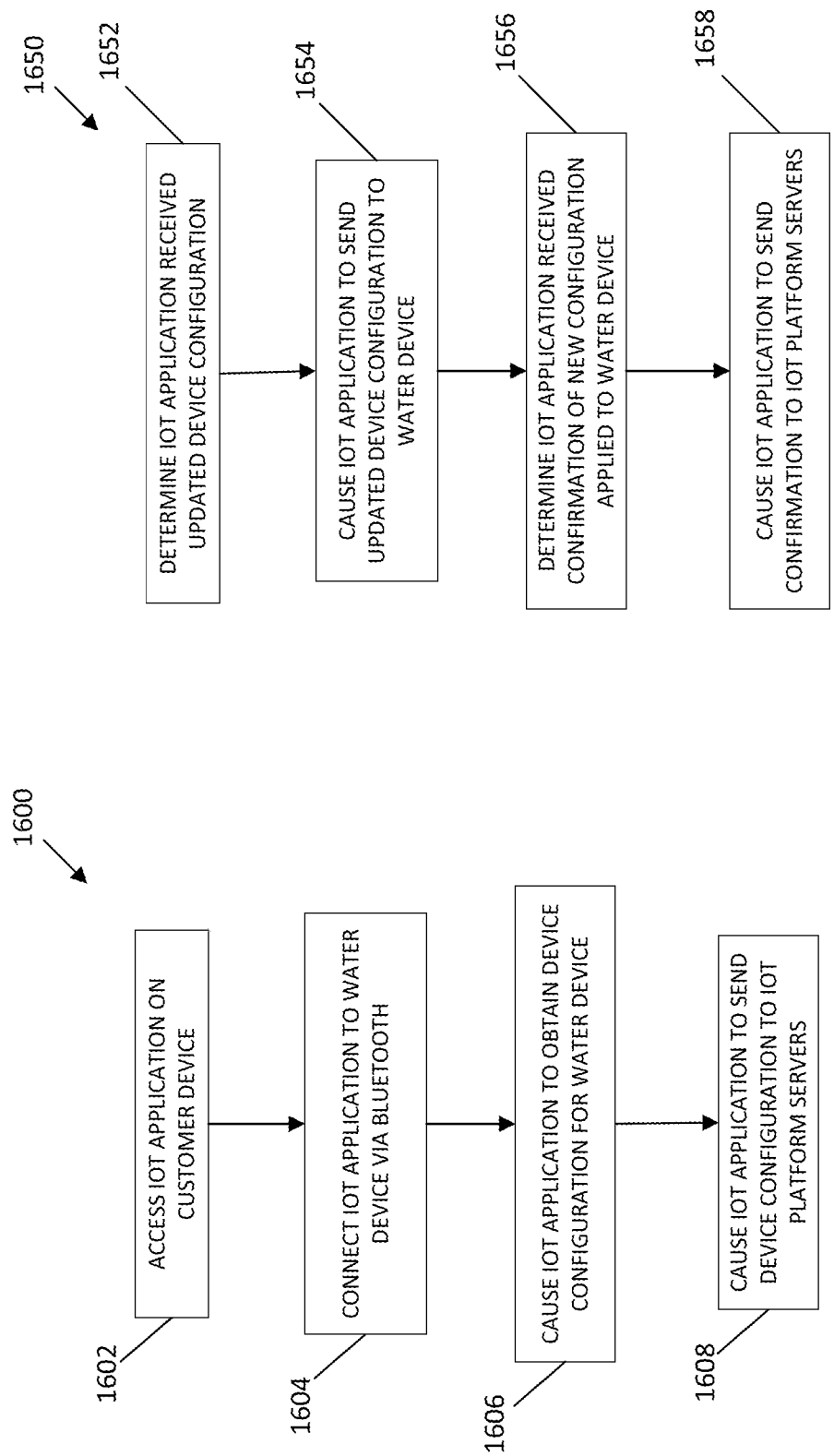
FIG. 16 is a flowchart of an example embodiment of a methods for configuring a network-enabled water device.

FIG. 16 provides example methods 1600, 1650 for connecting a network-enabled water device (i.e., IoT device) to the water system and to the IoT platform as described herein. In 1600, the water device can be configured with its initial operating and network connection parameters by connecting the IoT application to the IoT device (e.g., via Bluetooth on the customer's or installer's mobile device), obtaining a factory configuration from the IoT device, modifying any settings in the IoT application, and sending the updated configuration to the IoT platform.

At step 1602, a processor accesses an IoT application on a customer device.

At step 1604, the processor connects the IoT application to an IoT device via a personal area network protocol, such as Bluetooth®.

At step 1606, the processor causes the IoT application to obtain a device configuration for a water device corresponding.

At step 1608, the processor causes the IoT application to send the device application to one or more IoT platform servers.

Further, in 1650, the device configuration can be updated on the IoT device by receiving or creating the updated configuration in the IoT application, sending the updated configuration to the IoT device, receiving confirmation from the IoT device that the configuration was applied, and sending a confirmation (with the updated configuration, in some embodiments) to the IoT platform.

At step 1652, a processor determines that an IoT application received an updated device configuration.

At step 1654, the processor causes the IoT application to send an updated device to the water device.

At step 1656, the processor determines that the IoT application received confirmation of the new configuration applied to the water device.

At step 1658, the processor causes the IoT application to send a confirmation to one or more IoT platform servers.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A method comprising:
    receiving, by a processor, real-time operation data from a controller of a water system;
    retrieving, by the processor, a health profile of the water system from a memory device coupled to the processor, the health profile comprising at least one signature;
    comparing, by the processor, the real-time operation data to a normal operation signature of the health profile to produce results;
    determining, by the processor based on the results, that the real-time operation data diverges from the normal operation signature based on one or more thresholds;
    recording, by the processor, the real-time operation data in a log stored in the memory device;
    retrieving, by the processor, a plurality of problem signatures from the memory device;
    comparing, by the processor, the real-time operation data to each of the plurality of problem signatures;
    identifying, by the processor, that the real-time operation data does not substantially match any of the plurality of problem signatures;
    adding a new problem signature corresponding to the real-time operation data to the plurality of problem signatures stored in the memory device;
    monitoring, by the processor, the water system;
    determining, by the processor based on the monitoring of the water system, that a problem occurs in a device of the water system within a predetermined time period;
    determining that the problem is a mechanical failure of the water system based on the new problem signature; and
    causing a mechanical failure alert to be sent to a user device indicating that a filter of the water system should be replaced due to the mechanical failure.

2. The method of claim 1 further comprising:
    retrieving, by the processor, the plurality of problem signatures from the memory device;
    comparing, by the processor, the real-time operation data to each of the plurality of problem signatures;
    identifying, by the processor, a first problem signature of the problem signatures that substantially matches the real-time operation data;
    determining, by the processor, a problem associated with the first problem signature; and
    causing, by the processor, a first alert to be sent to the user device, the first alert indicating that the problem has been detected in the water system.

3. The method of claim 2, wherein the first problem signature corresponds to a future failure of a device of the water system, the method further comprising:
    determining, by the processor, that the water system is presently operating normally; and
    causing, by the processor, a second alert to be sent to the user device, the second alert suggesting that the device be repaired or replaced.

4. The method of claim 2 further comprising:
    determining, by the processor, that the water system is presently operating abnormally; and
    automatically connecting, by the processor, the user device to a customer support service associated with the water system.

5. The method of claim 1, further comprising:
    determining, by the processor based on the monitoring of the water system, that no problem occurs in a device of the water system within the predetermined time period; and
    adding the normal operation signature corresponding to the real-time operation data to the health profile.

6. The method of claim 5, further comprising:
    storing, by the processor, the normal operation signature in a signature library.

7. The method of claim 5, wherein the predetermined time period is a default time window.

8. The method of claim 5, wherein the predetermined time period is a time window interval selected by a user.

9. A system comprising:
a filtration system comprising a filter and a controller; and
a communication system comprising:
    a gateway device communicatively coupled to the controller and to an electronic communications network; and
    a server communicatively coupled to the controller via the electronic communications network and the gateway device, the server comprising a processor and a memory device configured to store instructions which, when executed, cause the processor to:
    receive data from the controller;
    determine a pressure value based on the data, the pressure value corresponding to a pressure at the filter;
    retrieve a signature from the memory device, the signature defining a maximum pressure for the filter and a threshold percentage;
    determine a percentage of the maximum pressure represented by the pressure value;
    determine that the percentage exceeds the threshold percentage;
    cause an alert to be sent to a user device associated with the filtration system, the alert indicating that the filter should be backwashed;
    cause the filtration system to perform a diagnostic check of the filter,
    determine, based on results of the diagnostic check, that a mechanical failure of the filtration system has occurred, and
    cause a mechanical failure alert to be sent to the user device indicating that the filter should be replaced due to the mechanical failure.

10. The system of claim 9, wherein the instructions, when executed, cause the processor to:
automatically backwash the filter by reversing flow of water through the filter for a predetermined time period.

11. The system of claim 9, wherein the instructions, when executed, cause the processor to:
determine a power consumption of the filtration system based on the data;
retrieve a correlation between power consumption and pressure from memory; and
determine the pressure value based on the filter power consumption and the correlation.

12. The system of claim 9, wherein the instructions, when executed, cause the processor to:
determine a power consumption of the filtration system;
determine a filter type of the filtration system;
determine a region in which the filtration system is located;
identify high-performing filtration systems of the filter type that are located in the region; and
determine a loading threshold for optimum power consumption based on performance data of the high-performing filtration systems,
wherein the maximum pressure is determined based on the loading threshold.

13. The system of claim 12, wherein the instructions, when executed, cause the processor to:
cause the filtration system to perform a first diagnostic check of the filter;
determine that a filter change has been performed since a second diagnostic check immediately preceding the first diagnostic check was performed;
determine that an elapsed time between two most recent filter changes is less than a predetermined threshold; and
cause a filter change alert to be sent the user device indicating that the filter is being changed too often.

14. A method comprising:
receiving, by a server from a user device via an electronic communications network, information identifying a problem with a water device within a water system;
obtaining, by the server from a memory device, water system data corresponding to the water device;
configuring, by the server, a water system simulation based on the water system data;
executing, by the server, the water system simulation to determine whether the water system simulation mitigates the problem;
determining, by the server, that the water system simulation does not mitigate the problem;
iteratively applying, by the server, alternative solutions to the water system simulation by modifying configuration parameters of the water system simulation until the water system simulation mitigates the problem; and
operating the water system using the configuration parameters of the water system simulation.

15. The method of claim 14, wherein the water system data comprises a device configuration of the water device and current operating conditions of the water system.

16. The method of claim 14, further comprising:
determining, by the server, that the water system simulation mitigates the problem;
sending, by the server, a notification to the user device indicating a configuration change of the water device; and
performing, by the server, the configuration change by sending an updated device configuration to the water device.

17. The method of claim 14, further comprising:
determining, by the server, that the water system simulation does not mitigate the problem;
identifying, by the server, a mechanical problem with the water system;
sending, by the server via the electronic communications network, an alert to the user device indicating that service of the water system is required; and
scheduling, by the server via electronic communication with a service provider, repair of the water system.

18. The method of claim 1, further comprising:
storing, by the processor, the new problem signature in a signature library.

* * * * *